US010439392B2

(12) United States Patent
Flett

(10) Patent No.: US 10,439,392 B2
(45) Date of Patent: Oct. 8, 2019

(54) STACKED MATRIX HIGH FREQUENCY DC-AC POWER CONVERSION SYSTEM AND METHOD

(71) Applicant: Rhombus Energy Solutions, Inc., San Diego, CA (US)

(72) Inventor: Frederick Flett, Indio, CA (US)

(73) Assignee: Rhombus Energy Solutions, Inc., San Diego, CA (US)

(*) Notice: Subject to any disclaimer, the term of this patent is extended or adjusted under 35 U.S.C. 154(b) by 329 days.

(21) Appl. No.: 15/437,340

(22) Filed: Feb. 20, 2017

(65) Prior Publication Data

US 2017/0244248 A1    Aug. 24, 2017

Related U.S. Application Data

(60) Provisional application No. 62/297,660, filed on Feb. 19, 2016.

(51) Int. Cl.
*H02J 3/00* (2006.01)

(52) U.S. Cl.
CPC ..................... *H02J 3/00* (2013.01)

(58) Field of Classification Search
CPC . H02J 3/00; H02J 2001/00; H02J 1/00; B60L 55/00; B60L 58/00; B60L 2210/00
USPC .......................................................... 307/52
See application file for complete search history.

(56) References Cited

U.S. PATENT DOCUMENTS

| | | | | |
|---|---|---|---|---|
| 6,191,500 B1* | 2/2001 | Toy | ........................... | H02J 3/46 307/64 |
| 8,212,401 B2* | 7/2012 | Linkhart | ................... | H02J 9/06 307/64 |
| 8,294,297 B2* | 10/2012 | Linkhart | ................... | H02J 9/06 307/64 |
| 8,345,454 B1* | 1/2013 | Krolak | ..................... | H02M 7/42 307/31 |
| 2011/0006600 A1* | 1/2011 | Fontana | ..................... | H02J 1/10 307/25 |
| 2011/0012430 A1* | 1/2011 | Cheng | ............... | H01L 31/02021 307/82 |
| 2014/0217983 A1* | 8/2014 | McCalmont | .............. | H02J 1/10 320/128 |
| 2016/0028229 A1* | 1/2016 | Mitsutani | ................ | B60L 58/13 307/82 |
| 2016/0233675 A1* | 8/2016 | Han | ........................ | H02J 1/102 |

* cited by examiner

*Primary Examiner* — Rexford N Barnie
*Assistant Examiner* — Joseph N Inge

(57) ABSTRACT

A serial acquisition of multiple power sources via one or more multiplexers which is circulated in many corridors of a multi-port system with a resonant engine. A controller manages multiplexer/switches connecting a first plurality of DC power sources and an auxiliary DC power source to a circulator. A multiplexer/switch revolves each source of power to inverters for DC-AC conversion. Reciprocity of power sharing and management of signal routing between input power sources can be performed to maintain discrete operation between the input/output power sources and individual power inverters for precise load power delivery. Regenerative power from a motor load can be directed to "recharge" an input power source. The resonant engine applied to each power source provides a constant conduit of energy during off-operation/cycles.

22 Claims, 17 Drawing Sheets

STACKED MATRIX HIGH FREQUENCY DC-AC POWER CONVERSION SYSTEM AND METHOD

CROSS-REFERENCE TO RELATED APPLICATION(S)

This application claims the benefit of U.S. Provisional Patent Application No. 62/297,660, filed Feb. 19, 2016, titled "Matrix Multi-mode Power Conversion System and Method," the contents of which are hereby incorporated by reference in its entirety.

FIELD

This invention relates to power selection and generation among multiple power sources. More particularly, the invention relates to a DC-AC multi-port source, power circulation system with a resonant engine.

BACKGROUND

Typical small or medium scale power systems are usually supplied by a single-power source. Difficulties arise when attempting to integrate different sources into a power system, especially if one or more of the additional sources are not AC. Typical solutions for multi-DC-source power systems are generally very complicated and not flexible, with significant inefficiencies occurring when multiple DC sources are tapped into. Of particular concern is isolation and power loss during conversion. In view of this, various systems and methods are described that provide efficient power conversion for various DC power sources, while incorporating a resonant system.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

In one aspect of the disclosed embodiments, a multi-port DC-AC power conversion system is provided, comprising: at least one or more primary DC power sources electrically connected to a controllable first input power switch; an auxiliary DC power source electrically connected to a controllable second input power switch; a power circulator electrically connected to the second input power switch and to the first input power switch, wherein the first power switch connection is either direct or indirectly via an controllable intermediary switch and a power recuperator, wherein the power recuperator is a resonant circuit; a controllable output power switch electrically connected to the power circulator; at least one or more inverter stages electrically connected to the output power switch, wherein a power pathway is formed between the one or more primary DC power sources and the auxiliary DC power source and the one or more inverter stages; and a controller, controlling an operation and switching frequency of: the first input power switch to conduct power between a selected one or more primary DC power source to the power circulator, the second input power switch to conduct power between the auxiliary DC power source to the power circulator, and the output power switch to conduct power between the power circulator to a selected one or more inverter stage, wherein DC power input from the power sources is converted to an isolated AC power from the selected one or more inverter stages.

In another aspect of the disclosed embodiments, the above system is provided, wherein at least one of the first input power, second input power, controllable intermediary, and output power switches is a multiplexer switch; and/or wherein the controller controls the first input power multiplexer switch to repeatedly cycle though a plurality of the primary DC power sources; and/or wherein the controller controls the output power multiplexer switch to output power through a plurality of inverter stages; and/or, wherein the system provides single phase AC power at an output of a single inverter stage and three phase AC power at the outputs of three inverter stages; and/or wherein at least one of the first input power, second input power, controllable intermediary, and output power switches is a bi-matrix switch; and/or wherein the controller controls the switches to only use power from a selected primary DC power source or the auxiliary DC power source; and/or wherein the controller controls the switches to alternatively use power from both a selected primary DC power source and the auxiliary DC power source; and/or wherein the controller controls the first and second input power switches to direct power from the auxiliary power source to one or more of the primary DC power sources, or direct power from one or more of the primary DC power sources to the auxiliary power source; and/or further comprising a load electrically connected to an inverter stage, wherein the controller controls the first and second input power switches and inverter(s) to direct power generated from the load to at least one of the primary DC power sources and the auxiliary power source; and/or wherein the controller controls the first input power switch and the intermediary switch to cause resonance in the recuperator stage, wherein energy is optionally fed to the power circulator or to at least one of the primary DC power sources; and/or further comprising a rectified AC grid as another input to the power circulator; and/or wherein at least one of the primary DC power sources and the auxiliary power source is a rechargeable battery; and/or wherein at least one of the primary DC power sources and the auxiliary power source is a solar panel.

In yet another aspect of the disclosed embodiments, a method for DC-AC conversion is provided, comprising: electrically connecting at least one or more primary DC power sources to a controllable first input power switch; electrically connecting an auxiliary DC power source to a controllable second input power switch; electrically connecting a power circulator to the second input power switch and to the first input power switch, wherein the first power switch connection is either direct or indirectly via an controllable intermediary switch and a power recuperator, wherein the power recuperator is a resonant circuit; electrically connecting a controllable output power switch to the power circulator; electrically connecting at least one or more inverter stages to the output power switch, wherein a power pathway is formed between the one or more primary DC power sources and the auxiliary DC power source and the one or more inverter stages; and controlling an operation and switching frequency of: the first input power switch to conduct power between a selected one or more primary DC power source to the power circulator, the second input power switch to conduct power between the auxiliary DC power source to the power circulator, and the output power switch to conduct power between the power circulator to a selected one or more inverter stage, wherein DC power input from the power sources is converted to an isolated AC power from the selected one or more inverter stages.

In yet another aspect of the disclosed embodiments, the above method is provided, further comprising, switching the first input power switch to cycle though a plurality of the primary DC power sources; and/or further comprising, switching the output power multiplexer switch to output power through a plurality of inverter stages; and/or further comprising, switching the switches to only use power from a selected primary DC power source or the auxiliary DC power source; and/or further comprising, switching the switches to alternatively use power from both a selected primary DC power source and the auxiliary DC power source; and/or further comprising, switching the first and second input power switches to direct power from the auxiliary power source to one or more of the primary DC power sources, or direct power from one or more of the primary DC power sources to the auxiliary power source; and/or further comprising: electrically connecting a load to an inverter stage; and switching the first and second input power switches and inverter(s) to direct power generated from the load to at least one of the primary DC power sources and the auxiliary power source; and/or further comprising, switching the first input power switch and the intermediary switch to cause resonance in the recuperator stage, wherein energy is optionally fed to the power circulator or to at least one of the primary DC power sources.

DETAILED DESCRIPTION

The overall premise of one or more embodiments of the proposed power electronic topology is the serial acquisition of multiple power sources via one or more multiplexers that can be circulated in many corridors of a multi-port system by a "resonant engine." The output of the various embodiments are suited for AC power delivery, but it is understood that the exemplary "core" of the various embodiments can be utilized for non-AC power delivery, if so desired. Expressly understood in the below discussion is the use of one or more controller(s) to manage the controllable switches, multiplexers used herein, as well as any other "controllable" device/circuit shown. Algorithms for managing the rate, frequency, duty cycle of the various devices are understood to be intrinsic to the below discussion and within the purview of one of ordinary skill in the art, once understanding the invention.

The topology is well suited for hybrid renewable power sources, micro-grids, and so forth, where recuperation and energy harvesting is intrinsic to the power conversion. Reciprocity of power sharing and management of signal routing between input power sources can be performed to maintain discrete operation between the input/output power sources and individual power inverters for precise load power delivery. In various embodiments, conventional power devices can be used, however, power losses are reduced if silicon carbide, SiC semiconductors are used for high frequency switching due to the lack of diode reverse recovery and IGBT tail current which are observed in silicon, Si devices. In various embodiments, sequencing and application of bi-directional switches utilize an algorithm to minimize power losses and increase system efficiency.

The architecture described can be considered as a "core" that would facilitate the interface between multiple single phase power inverters, if so desired, and three phase power inverters. Thus, a system of multiple "stacked" cores could be implemented to provide multi-level high power schemes with a high degree of flexibility, being well-suited for hybrid power and grid connected systems. Several examples of such a topology are described hereafter.

Figure 1:
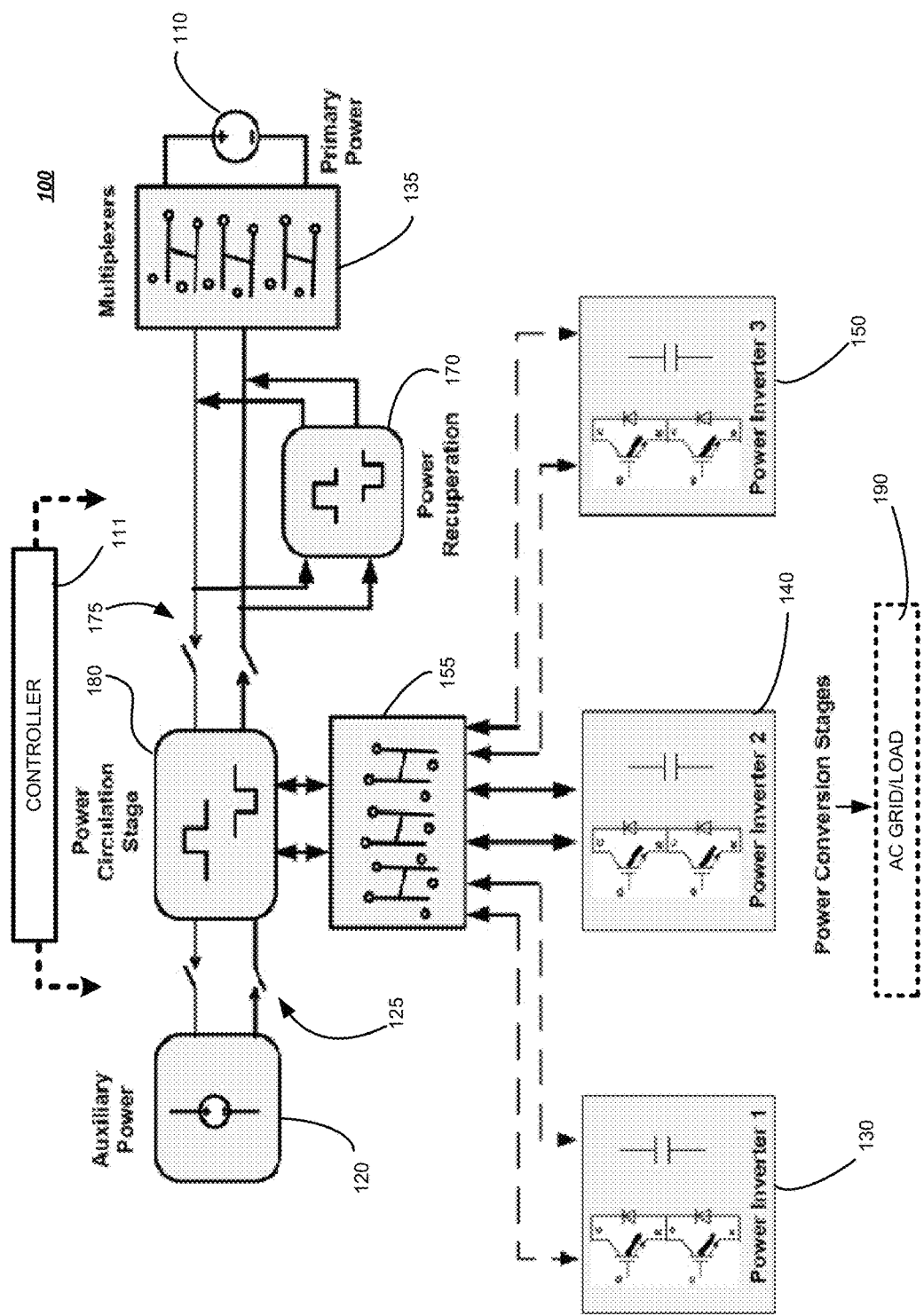
FIG. 1 is a block diagram illustration of an exemplary power conversion system.

FIG. 1 is a block diagram illustration of an exemplary power conversion system 100 effecting the "stacked" matrix multimode conversion, using a Multiport Resonant Engine with Bi-Directional Power Corridor. The topology presented is a generalization, showing the various "functional" elements as operational subsystems, some of which may or may not be necessary, depending on the mode of operation or desired performance objection.

The general architecture contains primary power source 110 and auxiliary power source 120 (shown here as DC sources), which are individually selected via controllable bi-matrix switches 125, 175 and multiplexer(s) 135. The primary power source 110 can be an arrangement of segmented power levels from a common power source that is selected via multiplexer(s) 135. Each power level segment may be chosen in sequence and rotated through the power conversion stages 130, 140, 150 in repetition. The auxiliary power source 120 is optional, however when implemented, its "port" can be a mirror set up of primary source's 110 "port," if so desired. That is, auxiliary power source 120 does not have to be an "additional" power source, but any one of a multiplexed power input that is routed to the auxiliary port, to allow the interleaving operational modes.

Controller 111 controls the operation of the multiplexers 134, 155, and switches 125, 175. In some embodiments, controller 111 also is capable of controlling some aspects of the switches and operation within the various stages (e.g., power circulation 180, power recuperation 170, power inverters 130, 140, 150), as well as other switches, devices, sources, etc., according to design preference.

The auxiliary power source 120, when used, provides power in a contiguous fashion to support primary power source 110; provides ride-through capability; provides power to the load via power conversion stages 130, 140, 150; and it can receive power while primary power source 110 is supplying the inverter load.

The selected power source's energy is forwarded to a power circulation stage 180, via controllable switches 125, 175. Switches 125, 175 may be bi-directional and/or be bi-matrix switches (bi-matrix switches can be configured to block voltages when in the "off" state), or any equivalent thereto. The switching frequency chosen in a computer simulation was 65 kHz to excite resonance of power circulation stage 180, which converts pulsed DC voltage from power sources 110, 120 a symmetrical AC waveform of 65 kHz. Of course, it is understood that other frequencies may be used, according to design preference. The resulting symmetrical AC waveform is continuous throughout the passage of interleaved power from either power source 110, 120.

Power circulation stage 180 provides one or more functions. For example, it can represent the content of primary power or auxiliary power. This representation is in the form of a high frequency symmetrical AC waveform where the amplitude of this AC waveform is a representation of the magnitude of input DC. It can also provide a transitionary source of the acquiesced power source while the source(s) of input power is being changed by the multiplexer 135 and between the primary and auxiliary power sources 110, 120. In this respect, it also provides a transitionary continuum of power between the input power source and power inverters 130, 140, 150 while in the "off" state cycle period of primary, or in auxiliary power acquisition. Also, it can in conjunction with the switches 125, 175 facilitate isolation between the input power source(s) and the power inverters 130, 140, 150. This can be seen in the switching waveforms identified in the modes of operation Modes 0-3, as discussed below.

Output of power circulation stage 180 is rectified (internally or via a rectification stage—not shown) and commuted to DC bus(es) of power conversion stages 130, 140, 150 by multiplexer 155. Multiplexer 155 operates in series with either bi-matrix switches 125, 175. There is no overlap between any set of two switches that conduct power to power converters/inverters 130, 140, 150, therefore providing isolation between power sources 110, 120 and power converters/inverters 130, 140, 150.

Power converters/inverters 110, 120, 130 are illustrated here as three separate single-phase power inverters, which can be individually selected by multiplexer 155, for 3-phase AC power delivery. However, 1-phase or other phasing can be implemented, by reducing the number of converter/inverter stages. Also, the circuitry shown in the power converters/inverters 110, 120, 130 are illustrative and simply denote the inverter pathways, therefore, should not be construed as being limited to the circuit elements shown. Power output from the power converters/inverters 110, 120, 130 may be fed to the AC grid or the AC line 190 of the installation, or electrical loads as well as electric motors that host the ability to supply regenerative power.

Recuperation stage 170 (in concert with FET18 and FET 19, for example—see FIG. 2) can be used as a transfer circuit of surplus, regenerative, charge power that may be generated by the power inverter load, to primary power source 110. The auxiliary power source 120 can also be routed to recuperation stage 170 for delivery to primary power for charge cycling. Rectification of recuperation stage's 170 power may be performed internally or via a separate rectification stage (not shown). Recuperation stage 170 may be a resonant circuit, as described, for example, in U.S. Pat. Nos. 9,248,071 and 9,461,556, the contents of which are incorporated by reference in their entirety.

As stated above, some aspects of the switching may be embedded in the respective stages, rather than presented as a separate element. For example, in some embodiments, switch(es) 125 may be designed as part of the auxiliary power 120, or the power recirculation stage 180, and so forth. Accordingly, various placement and arrangement of the switches and/or multiplexers described herein may be altered without departing from the spirit and scope of this disclosure.

Simply speaking, the output of the system 100 represents an isolated replication of the selected input (110, 120), or a modified version of this input, that is dispatched to power converters/inverters (130, 140, 150), via an output multiplexer 155. The compact topology of system 100 provides a controllable three-way bidirectional corridor of power flow, supplying isolated AC power from various DC power sources.

The exemplary topology described can operate in four possible modes of operation, Mode 0 through Mode 3, thus demonstrating variability in the design for different system purposes and configurations.

Mode 0

This mode describes the transition and path of power through each of the functional blocks above as it relates to the power flow through the system. The purpose of this mode is twofold. It may be used to charge the DC bus capacitors (see FIG. 2) in the circuit prior to normal sequencing of power from the power source (110, 120) to power conversion. And secondly it is used as the normal path for transiting power to the load (not shown) when one or more of the power converters/inverters 130, 140, 150 are operative.

In the start-up mode, either power source 110, 120 may be used. The Multiplexer 135 (and/or switch 125) chooses one of the power inputs and acquiesce this at a rate of 4 kHz. One of the bi-matrix switches 125, 175 interpose with the "on" period of the 4 kHz periodicity and toggle these switch(es) 125, 175 at a rate of 65 kHz. It should be noted here, for this scenario, the auxiliary power source switch 125 is not gated by the default switching frequency (e.g., 4 kHz) as it does not have a multiplexer. Thus, the recuperation stage 170 is identified with the primary power inputs as they are acquiesced at the default switching frequency.

This concludes a partial resonant AC waveform in the primer/recuperation stage 170. In juxtaposition, the power circulation stage 180 instantaneously reaches resonance with an AC representation voltage of equivalence to the selected DC input voltage. The multiplexer switch set 155 commences switching in the "off" period to the DC bus of one of the selected power converters/inverters 130, 140, and 150. The sequence requires very little resonance in recuperation stage 170, to achieve the time displacement between the switching pairs, either 125 or 175, and the multiplexer switch set 155, resulting in operational isolation between input and output.

Furthermore, the acquisition of power via the multiplexers 135 and 155 can be carried out at a much lower rate than the 4 kHz rate chosen here to fulfill the maintenance of power converters/inverters' 130, 140, 150 operation. This will be load dependent, but can be used in the control strategy to reduce switching losses. In this context there is adequate dead-time applied between each of the switching-sets 125, 175, 155 to prevent contention between the input source (110, 120) and power converters/inverters' 130, 140, 150 operation.

Mode 1

This mode relates the use of both primary power source 110 and auxiliary power 120 in a contiguous fashion that may be used at start-up, or at any time through the passage of routing power to the power converters' 130, 140, 150 rails. The routine is similar to Mode 0, only this time both switch-sets 125 and 175 are operative. Both switch sets 125, 175 are toggled alternately at 65 kHz. In this case the secondary power source, 120 is alternated in the "off" period of the 4 kHz acquisition period and then sequenced to the power converters/inverters 130, 140, and 150 via multiplexer switch-set 155. Multiplexer switch-set 155, that finally transits the power from the power circulation stage 180, is also only operative in the "off" period of the 4 kHz frequency and follows the acquisition of power from the auxiliary power source 120. The power circulation stage 180 is now being fed power from two directions with no overlap between switches 125, 175.

The interval time to transit power in the off-period to the power converters/inverters' 130, 140, 150 rails is half the time in the off-period of 4 kHz compared to Mode 0. Both sets of switches 125, 175 are operated in series and do not overlap. Furthermore, the multiplexer switch-set 155 that finally routes the power to the power converters/inverters 130, 140, 150 is only operative after the switch sets 125, 175 have stopped.

This utility can be used as a "ride-through" mechanism for sags in primary power source 110, or to support additional voltage necessary for load compensation. It can also be used to relieve, or, compensate for applications where solar power is the primary source in situations where solar irradiance fluctuates.

Mode 2

Mode 2 represents the power flow that takes place between the two power sources 110, 120, Sub-systems 110, 120, 170, 180 are in play here. This may be applicable after a period of regenerative power has been transferred from the power converters/inverters' 130, 140, 150 load to a power source 110, 120 for charge cycling, for example.

If it is required to conduit power from the auxiliary power source 120 to the primary power source 110, this can be done while the auxiliary power source 120 is serving the loads of the power converters/inverters 130, 140, 150. In some embodiments, it can be shown that the power to each entity, providing DC power to the primary power source 110, and to the power converters/inverters' 130, 140, 150 DC bus can be achieved in an interleaved operation. This is provided by the power circulation stage 180 and the sequencing of power to each recipient without switch overlap between switches 125, 175 and 155. This mode of operation is symmetrical between either power source 110, 120.

The power recuperation stage 170 provides a gain factor between the RMS voltage output at the power recuperation stage 170 and the output of multiplexer 155. The power recuperation stage 170 also provides power circulation and will normally be followed by a controlled rectification for DC charging the primary power source 100 in this scheme. It could also be used as an ancillary port for extension to the system.

Mode 3

This mode represents the power return of regeneration from power converters/inverters' 130, 140, 150 load to either the primary power source 110 or auxiliary power source 120. Two switch sets are operative in this mode, one of the switch set(s) in multiplexer 155 and either switch set 125 for primary power source 110 or switch set 175 for the auxiliary power source 120. One of the switch sets in multiplexer 155, representing the power regeneration return from the power converters/inverters 130, 140, 150 is toggled at a frequency of 65 kHz, and the switches in the upper region transit the power to either source at 4 kHz.

If a rectifier stage is used at the entry to the power converters/inverters 130, 140, 150, this must be an active rectifier to allow bi-directional operation of power flows. Additionally the main DC bus capacitors associated with the power converters/inverters 130, 140, 150 must hold an initial charge voltage for the bi-directional return of regeneration power to take place.

The power circulation stage 180 in conjunction with the power recuperation stage 170 is seen to reduce waveform distortion of the power return and has a smaller gain factor than in the previous mode 2.

Simulations have been run to validate the concepts and modes described above. As is apparent to one of ordinary skill, the circuit elements used in the accompanying simulations are selected to perform the functionality described and can/may be altered or changed in view of design objectives. Therefore, other values/elements, etc. may be used without departing from the spirit and scope of this disclosure.

Figure 2:
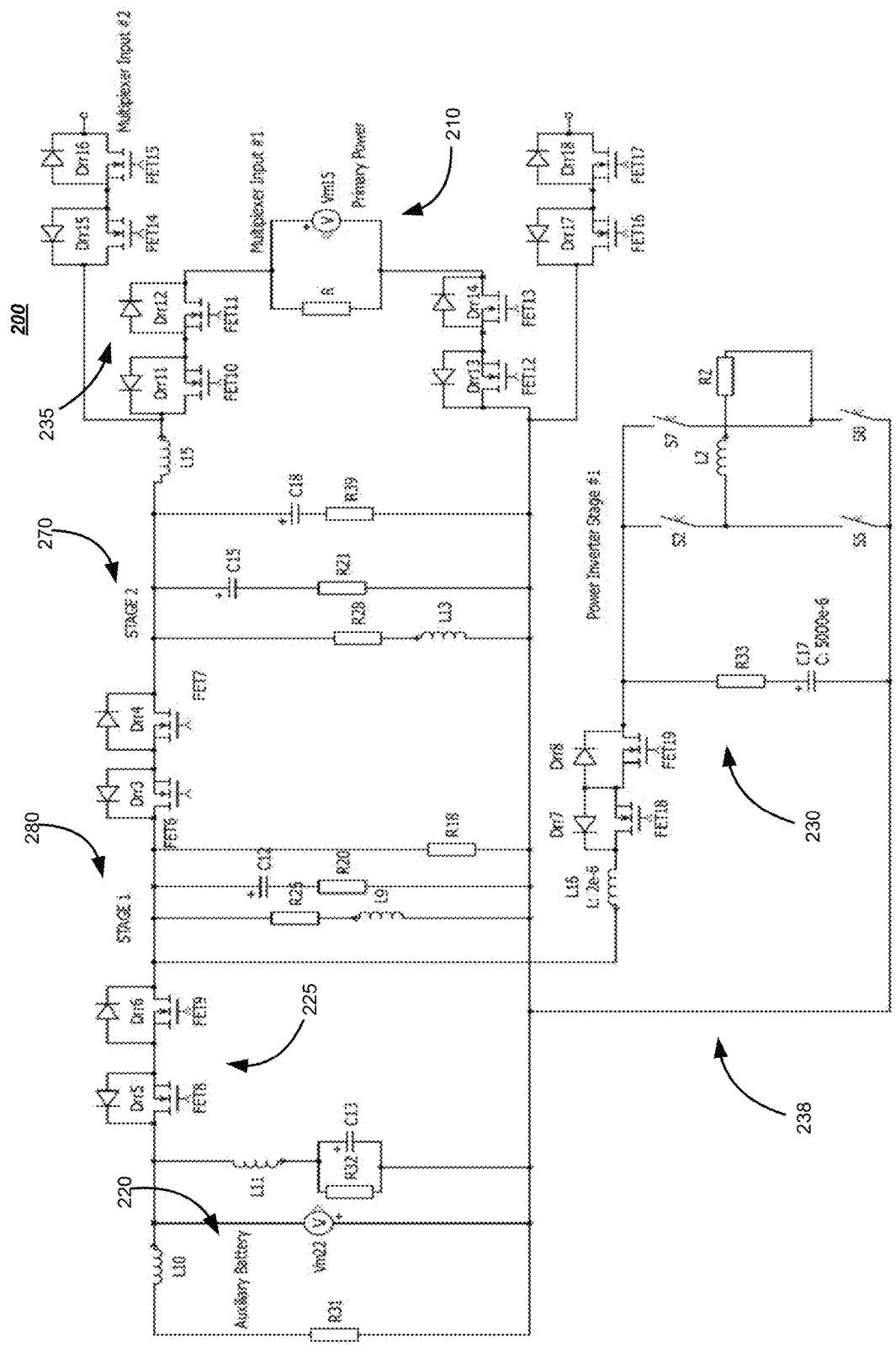
FIG. 2 is a schematic of a generalized circuit used for a simulation run for the topology described.

FIG. 2 is a schematic 200 of a generalized circuit used for a simulation run for the topology described. Stage 1 (280) represents the main power circulation location while stage 2 (270) represents the recuperation operation, described in FIG. 1. Power semiconductors FET8, FET9 (225) are part of bi-matrix switches routing power from auxiliary power 220. FET10 through FET14 identify a multiplexer switch set (235) that directs primary power 210 to the main circuit. There are normally a plurality of switches used to route multiple power sources the power inverters. However, for simulation purposes and brevity, only one set (as well as one inverter/conversion stage 230) is shown. Of course, depending on design implementation, multiple switches and conversion stages could be added.

As stated previously, rectification stages could be installed prior to FET18 and FET19 to commutate the high frequency AC signal to DC for the power inverter DC bus. 238 The DC Bus is applied above and below the power inverter switches S2-S5, and S7-S8 respectively.

It may be possible to eliminate this with demodulation that takes place naturally in the process of commutation between switches (that channel power from the power sources and those of the power inverter—e.g., FET8-9, FET6-7, FET18-19).

Simulation runs have been made on the above topology, and are discussed below with references to circuit/stage elements of FIG. 2.

Figure 3A:
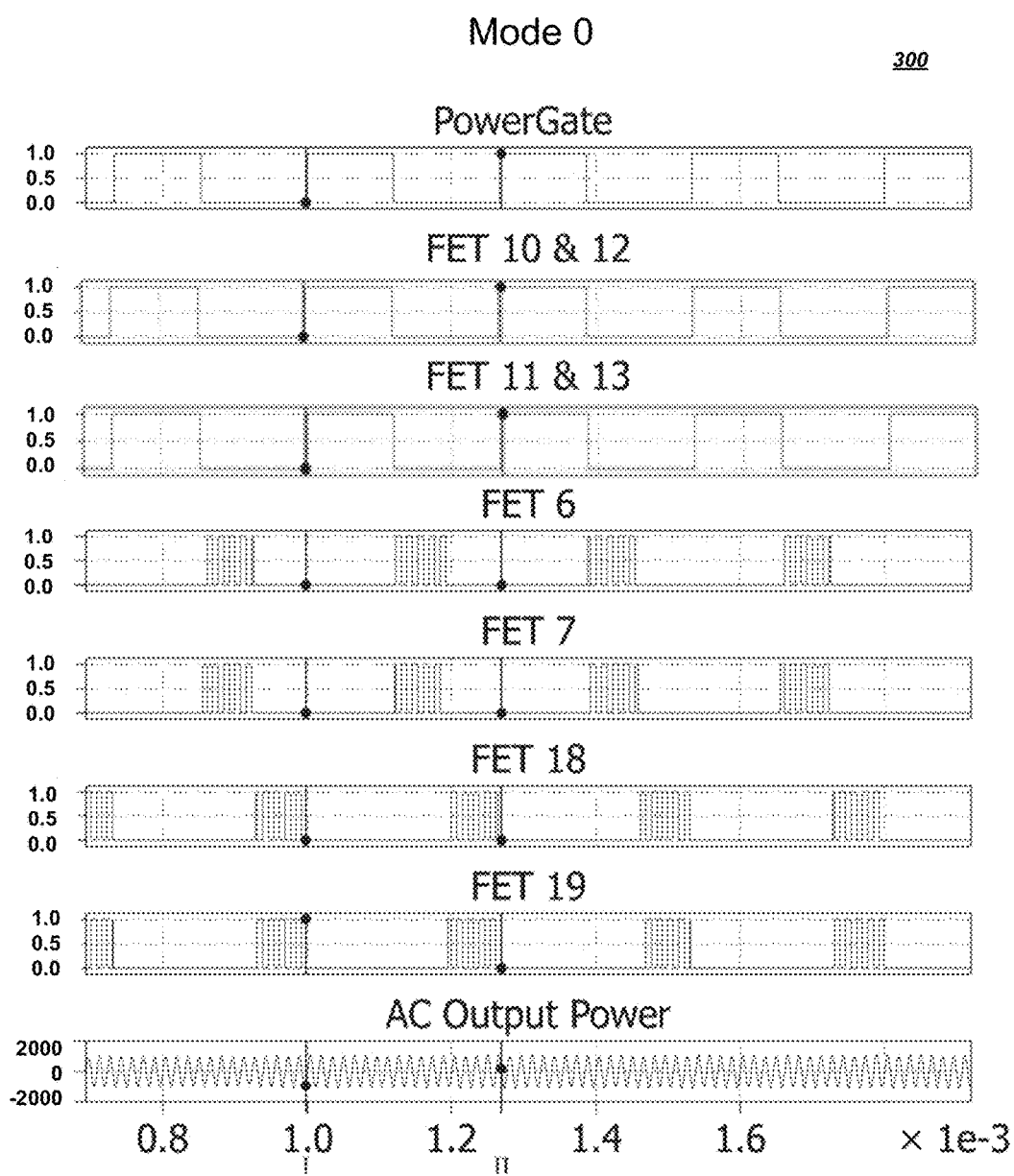
FIG. 3A is a plot of a Mode 0 simulation run using 65 kHz multiplexer switching under a 4 kHz switching cycle.

FIG. 3A is a plot 300 of a Mode 0 simulation run for various voltages in the circuit of FIG. 2, as a function of time (Second), using 65 kHz multiplexer switching under a 4 kHz switching cycle. The different traces show different stages/elements and their switching sequence related to the transition of power from the primary source to the power converter/inverter DC bus. The positive period of the 4 kHz frequency, shown in the topmost trace, is also the gate that the power is allowed to enter the main circuit, which in this case is +/−300 volts. In the "off" period related to the acquisition of power, switches FETE and FET7 are activated to facilitate the power circulation, which outputs a continuous AC waveform of 760V rms. Finally, FET18 and FET19 conduct the power to the power inverter 230; wherein in this simulation DC bus capacitor (C17) was initially charged to 300V. The decay in the capacitor voltage was only 1V in the 4 kHz period. As can be seen in the remaining traces of FIG. 3, the switch sets (FETs) are commutating at 65 kHz.

Figure 3B:
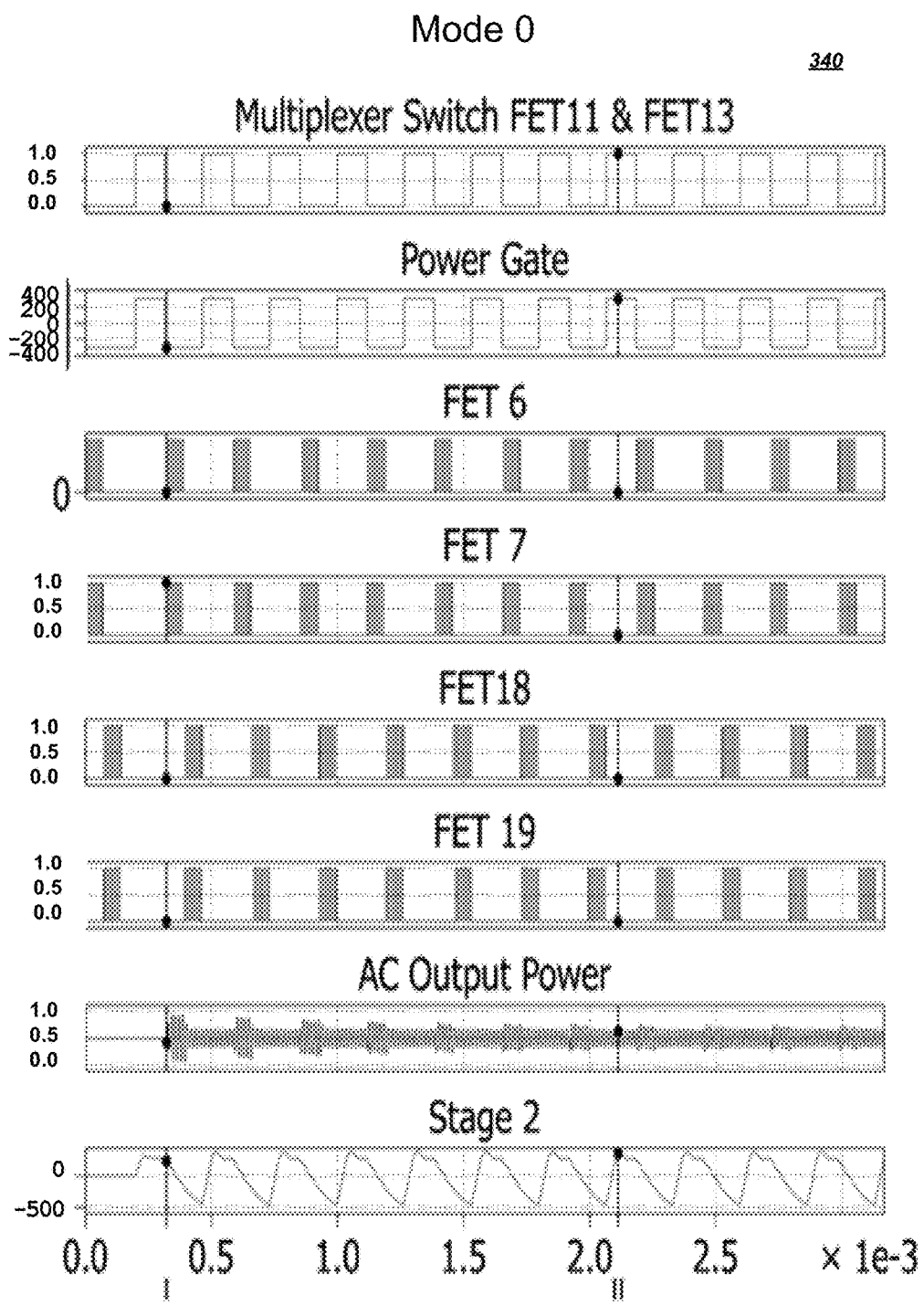
FIG. 3B is a plot of a Mode 0 simulation run for a "worst" case scenario.

FIG. 3B is a plot 320 of a Mode 0 simulation run for various voltages in the circuit of FIG. 2, as a function of time (Second), using 4 kHz switching with the switching pattern of transfer to the power rails limited to 2 kHz. This demonstrates a "worst" case scenario where the power sources are at zero and interleaved in tandem to supply power to the power inverter/converter DC bus rails. The top trace identifies the power source's multiplexer switches at 4 kHz. Directly below this trace is the power input of +/−300 VDC at the same frequency pattern.

FET6&7 traces relate that stage 1 switches operate at 65 kHz in the negative period of the 4 kHz pulse train. There is therefore no in-line power being applied to the circuit in this negative period time. However, the AC output power commences after this occurrence. The event that occurs is that the passive components in stage 2 combine to provide a pulsed waveform for the primary power that permit FET6&7 to commence the power circulation (180). This waveform is seen the bottommost trace. Finally, FET18&19 commutate the AC power to the power inverter/converter DC bus rails.

Figure 3C:
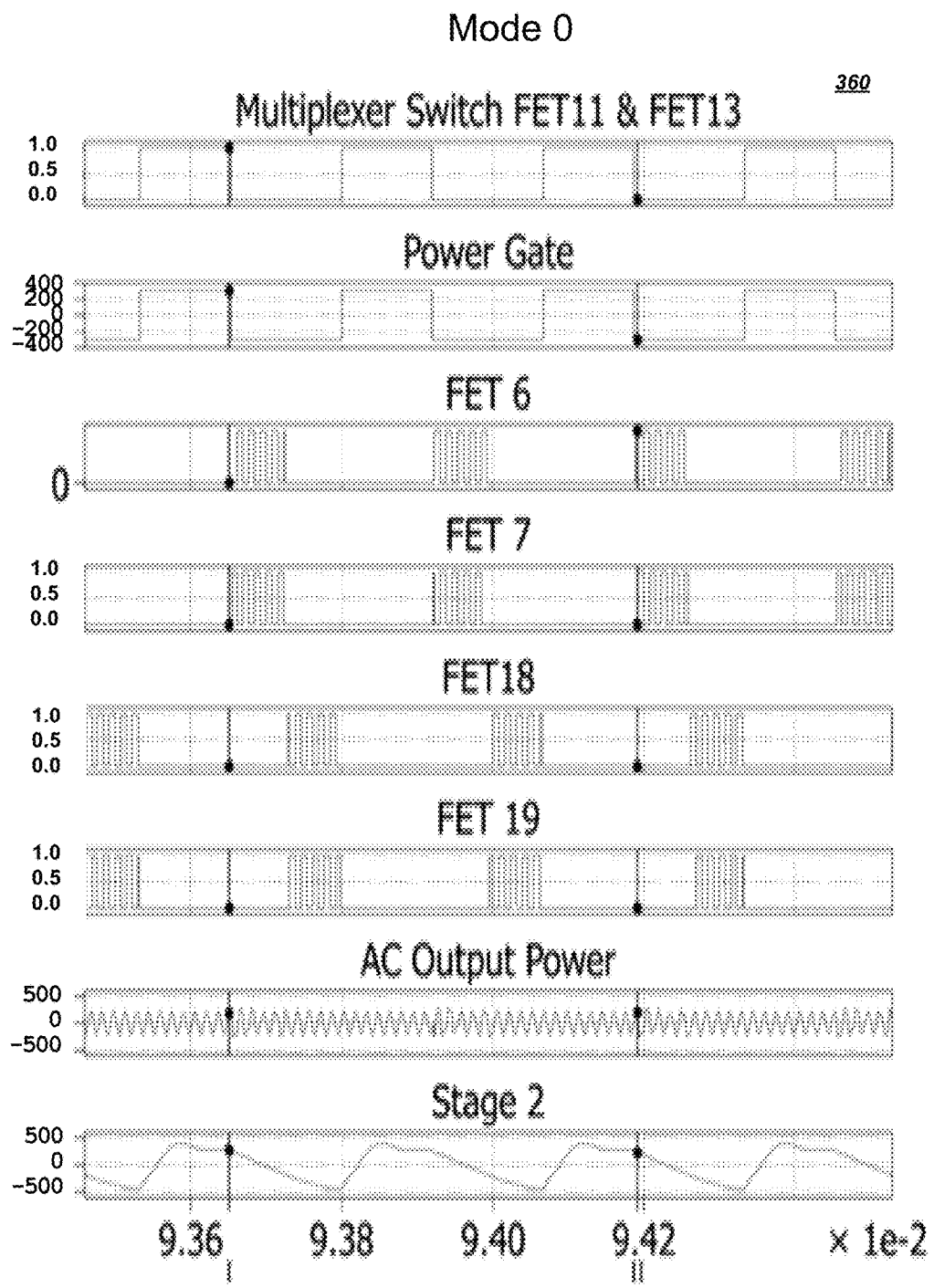
FIG. 3C is a plot of a Mode 0 simulation run showing the output voltage of FIG. 3B at a later, larger time interval.

FIG. 3C is a plot 360 of a Mode 0 simulation run for various voltages in the circuit of FIG. 2, as a function of time (Second), showing the output voltage of FIG. 3B at a later, larger time interval. Specifically, FIG. 3C shows irregular AC Output Power at the commencement of operation. However, after the system's capacitors reach an adequate level to support the power inverter/converter load, symmetry occurs, as seen in FIG. 3C. The AC rms voltage output in this case was 157 V.

Figure 3D:
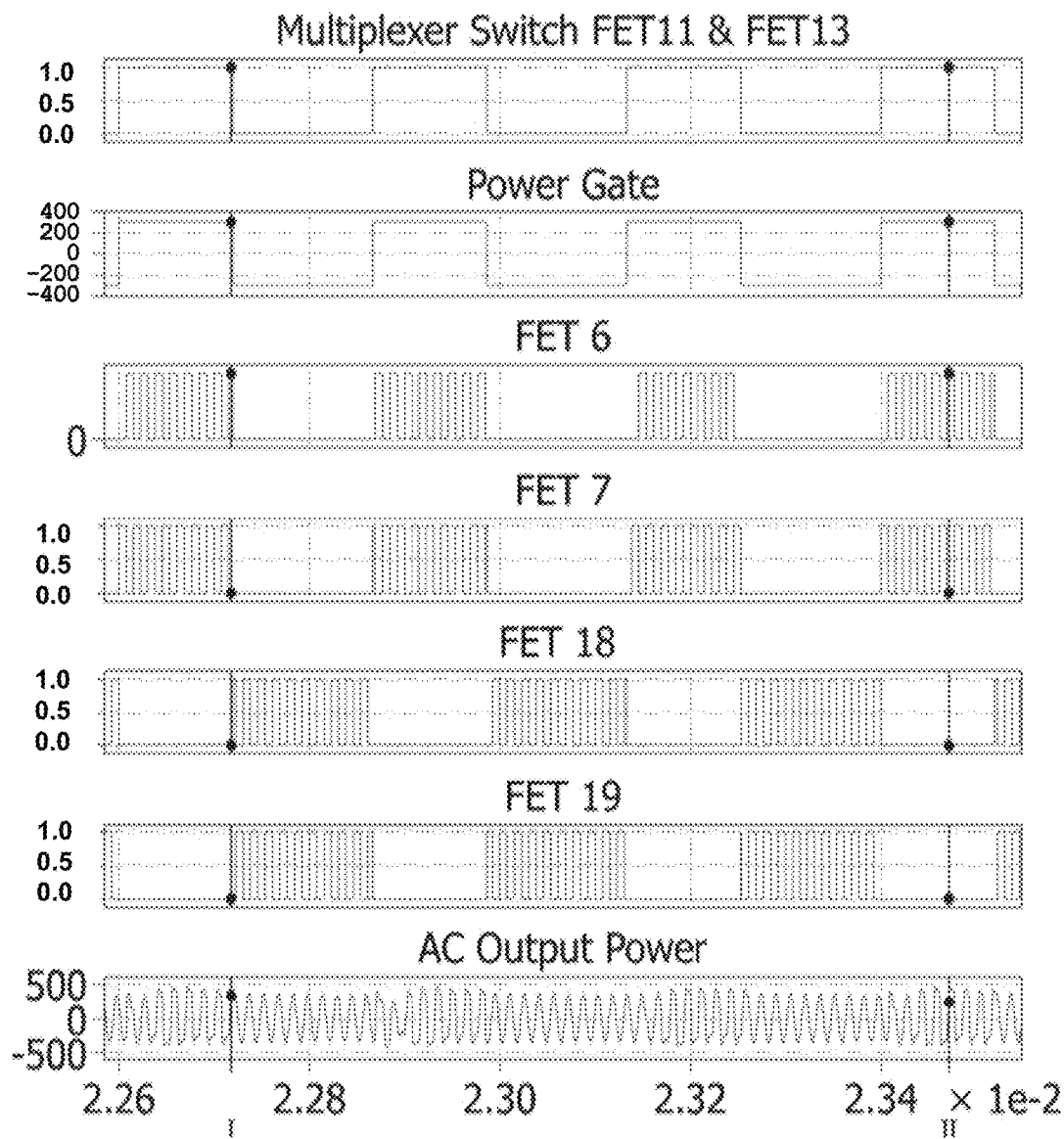
FIG. 3D is a plot of a Mode 0 simulation run using 65 kHz switching to when the power gate is active.

FIG. 3D is a plot 380 of a Mode 0 simulation run for various voltages in the circuit of FIG. 2, as a function of time (Second), using 65 kHz switching to FET6&7 in the period when the power gate is active, that is, the positive phase. The commutation between these switches and power inverter switches FET18&19 follows this event. As would be expected, the AC rms voltage is higher than in FIG. 3C and is nominally 282V. The envelope of the output voltage is acceptable with some influence from the direct in-line power switching between the primary power source and the power circulation devices FET6&7.

Figure 4A:
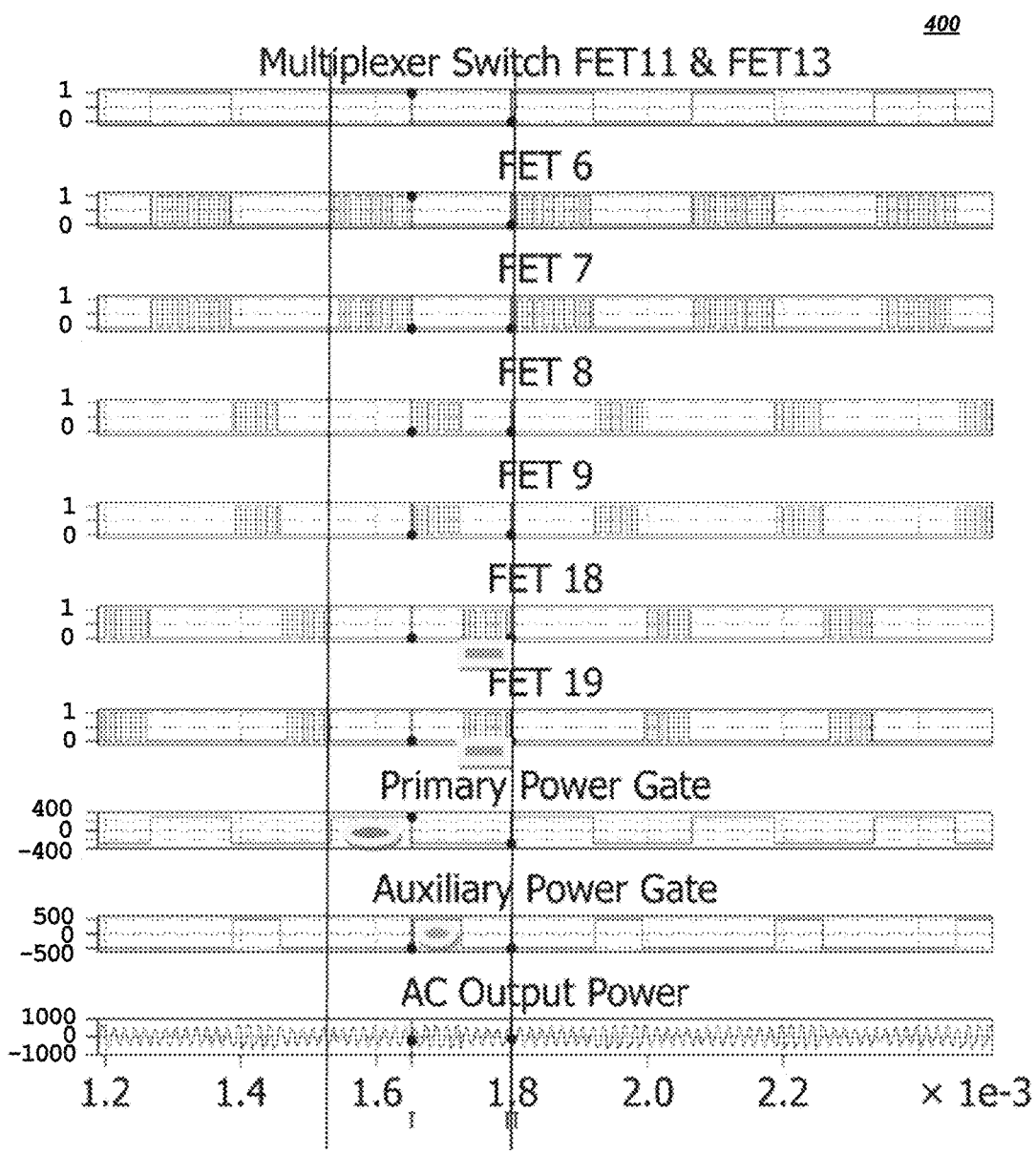
FIG. 4A is a plot of a Mode 1 simulation run with two power sources.

FIG. 4A is a plot 400 of a Mode 1 simulation run with two power sources (primary & secondary) interleaved in sequence and transitioned to the power inverter/converter DC bus in one 4 kHz frequency period. This represents the situation where the auxiliary power 220 is used to boost the primary power source 210 in the power circulation (stage 1) or, where it may be necessary to receive charge at one of the power sources 210, 220 while still maintaining the supply of power to the power inverters/converters 230.

As can be seen by the traces, there are two power sources being applied to stage 1, the auxiliary +/−500V DC and primary +/−300V DC. As seen, these voltages arrive at different times and the primary power associates with the traces for FET6&7 (oval marker at Primary Power Gate trace), while the auxiliary power associate with traces for FET8&9 (oval marker at Auxiliary Power Gate trace). FET18&19 commute the power to the power circulation (stage 1). As in previous cases, the multiplexer data acquisition is being performed at 4 kHz. The resultant AC rms voltage from this operational sequence is approximately 435V with the tandem power source voltage being applied. This can be obviously varied by manipulating either source of voltage, or may be augmented with a DC boost stage at either source.

This mode of operation is favorable for situations where power inverter load fluctuations occur or in situations where imbalance occurs between power being acquiesced via the multiplexers from the different power sources. Further, trials carried out on this mode implemented dead-time between the applied pulse and the power trains to compensate for rising and falling switching edges. These were varied between 6 and 10 Micro Seconds. The result of the dead-time changes did not cause any deterioration in the AC output waveform and had minimum effect on AC rms voltage output from the circuit.

Figure 4B:
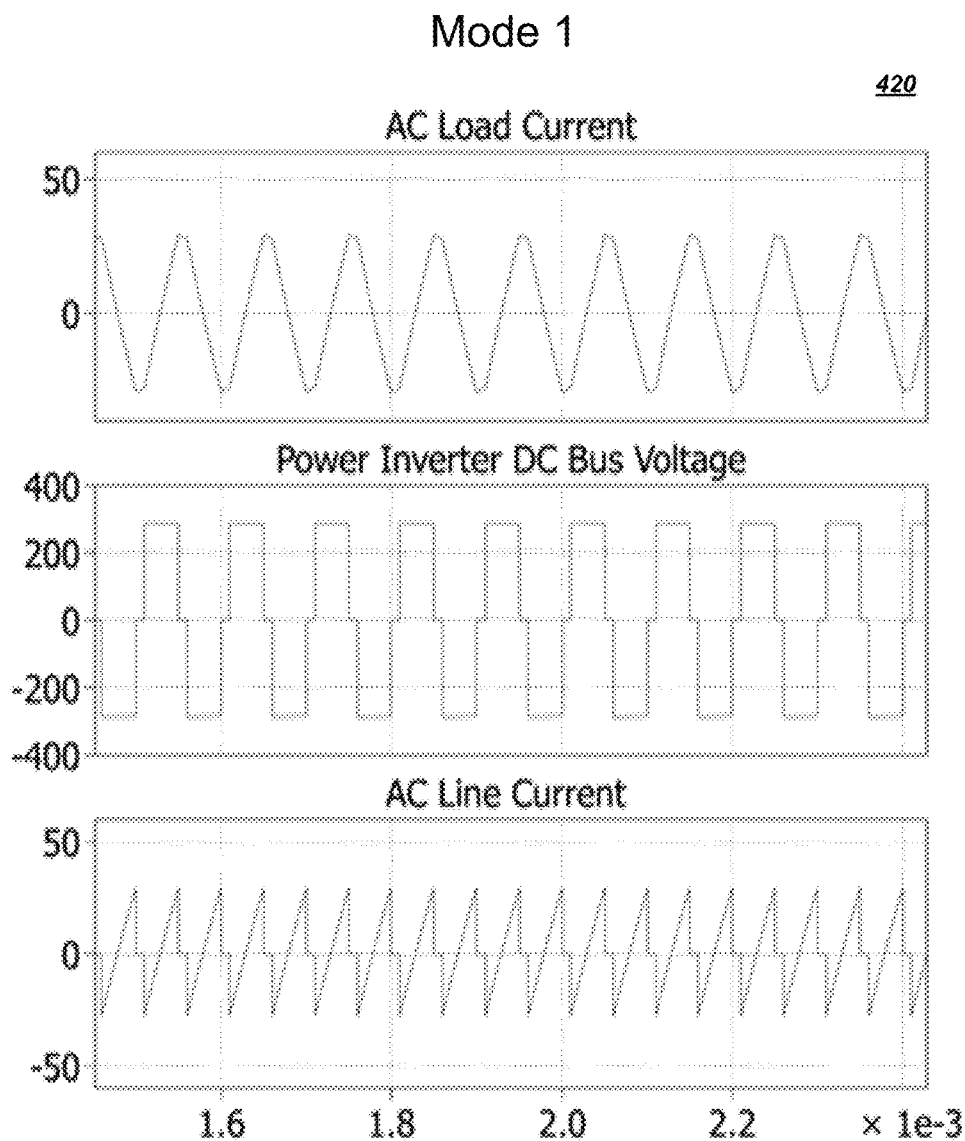
FIG. 4B is a plot of a Mode 1 simulation run for various voltages.

FIG. 4B is a plot 420 of a Mode 1 simulation run for various voltages in the circuit of FIG. 2, as a function of time (Second), showing AC load current, Power Inverter DC bus voltage and AC line current. As can be seen, the AC load current is 20 A rms, DC, Power Inverter DC bus voltage is +−300V and the in-line AC line current is 15 A. This identifies with a single power inverter/converter stage.

Figure 5:
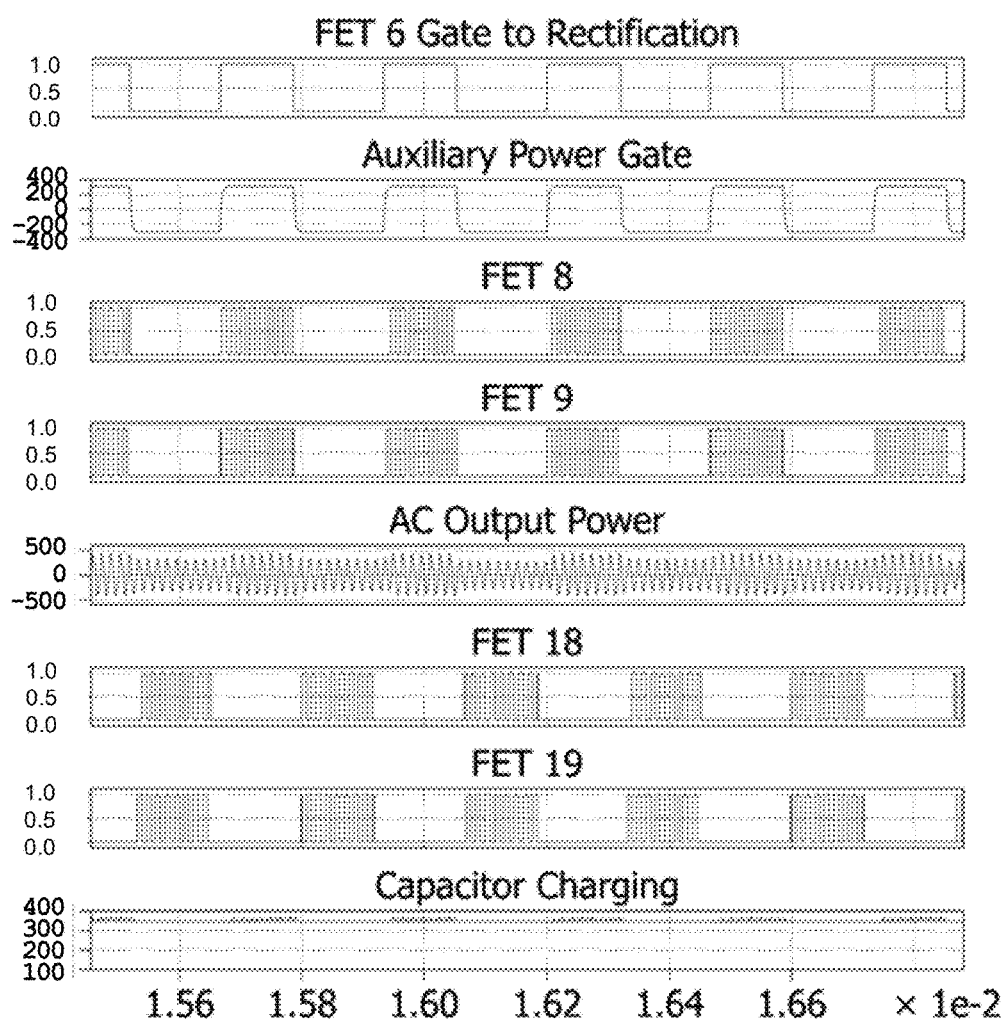
FIG. 5 is a plot of a Mode 2 simulation run showing the transfer of power and recuperation from the auxiliary power source.

FIG. 5 is a plot 500 of a Mode 2 simulation run for various voltages in the circuit of FIG. 2, as a function of time (Second), showing the transfer of power and recuperation from the auxiliary power source 220. The assumption here is that the primary power source 210 is a rechargeable power source. The top trace identifies the gating time for FETE to route the auxiliary power +/−300V from "left-to-right." FET8&9 provide the excitation for the power circulation stage 280. The power output from the power circulation stage 280 is identified as the trace labeled as AC Output Power. It is understood that the power inverter rails can still be routed power as this circulation takes place, as shown for example by the traces for switches FET18&19.

Tests of this configuration showed no detriment to the power level or to waveform symmetry when delivering the recuperation power to the primary source 110 and the power inverter/converter DC bus. A rectifier stage was added to stage 2 to convert the AC voltage to DC for charging or other purposes. The initial capacitor charge voltage level was 300V. The charge level reached 350V DC after 6 mS. The AC output power reached 274V rms and the symmetry improved with reduced undulation as the DC bus capacitors became fully charged.

Figure 6:
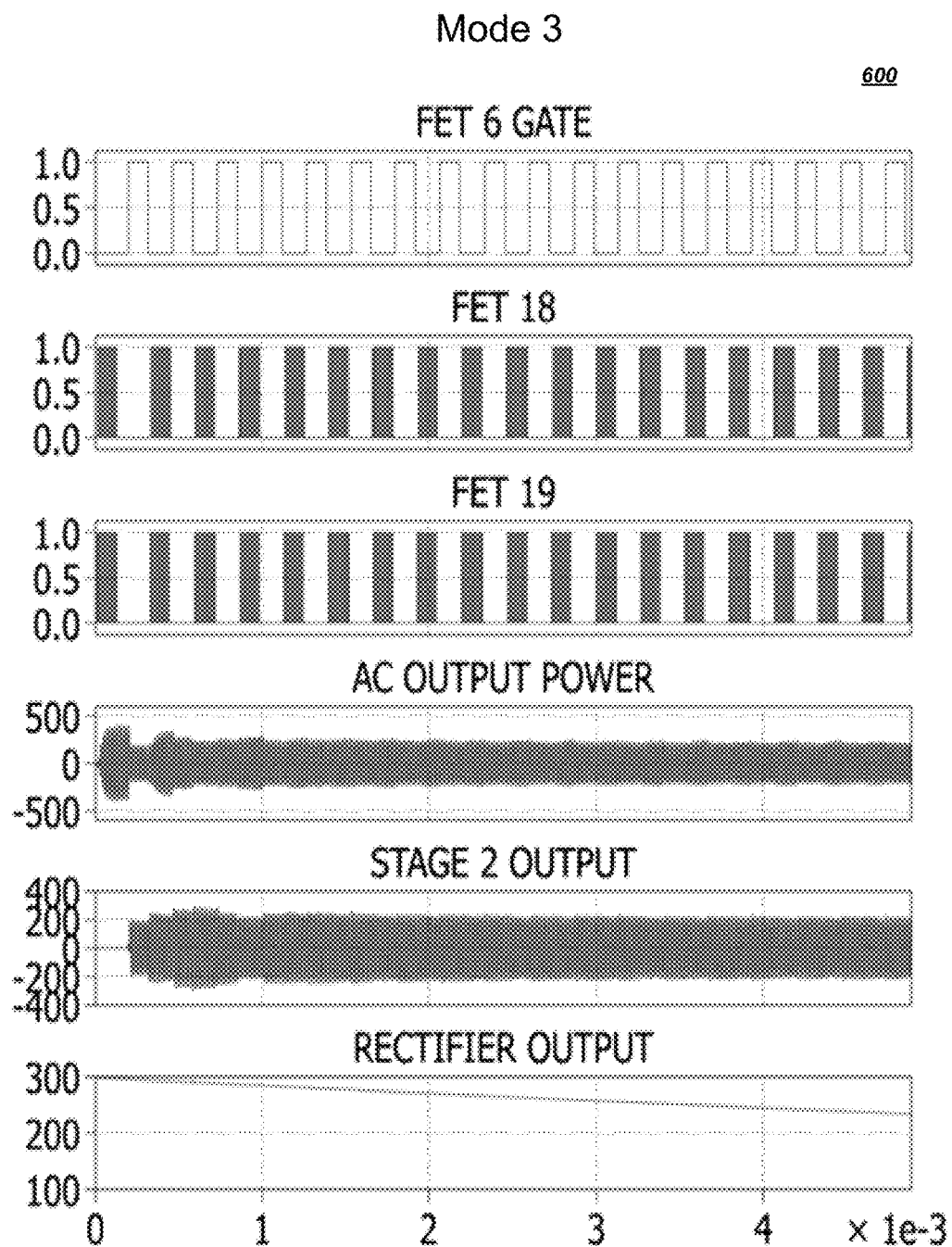
FIG. 6 is a plot of a Mode 3 simulation run where regenerative power is returned to either the primary power source or auxiliary power source.

FIG. 6 is a plot 600 of a Mode 3 simulation run for various voltages in the circuit of FIG. 2, as a function of time (Second), where regenerative power is returned to either the primary power source 210, as in this simulation, or auxiliary power source 220. In this case FET18&19 manage the regenerative power. It was discovered that if the bi-matrix switches (e.g., FET6) that commute the power are in the "off" period of gating voltage to the primary power stage, the symmetry of the waveform is considerably improved. FET6 is responsible, in this case, as the gate that moves the circulatory power from the power inverter rails via stage 1. The opening of this gate moves the circulatory power in stage 1 to stage 2. The recovery of the regenerative power takes place in the "off" period when gate FET6 is not commuting power to the primary rectification stage. The AC output rms voltage representing regenerative power was 168V rms, stage 2 output was 163V rms, and the rectifier output was 264V DC, in this period.

The exemplary topology can be devised into subsystems relevant for the various modes of operation discussed. A discussion in terms of these subsystems is now presented, understanding it is made for purposes of ease of explanation and in the context of these simpler subsystems. Accordingly, some of the variables/elements used may vary from the discussion above.

Mode 0—Multiplexed Power & Resonant Engine Operation

Figure 7:
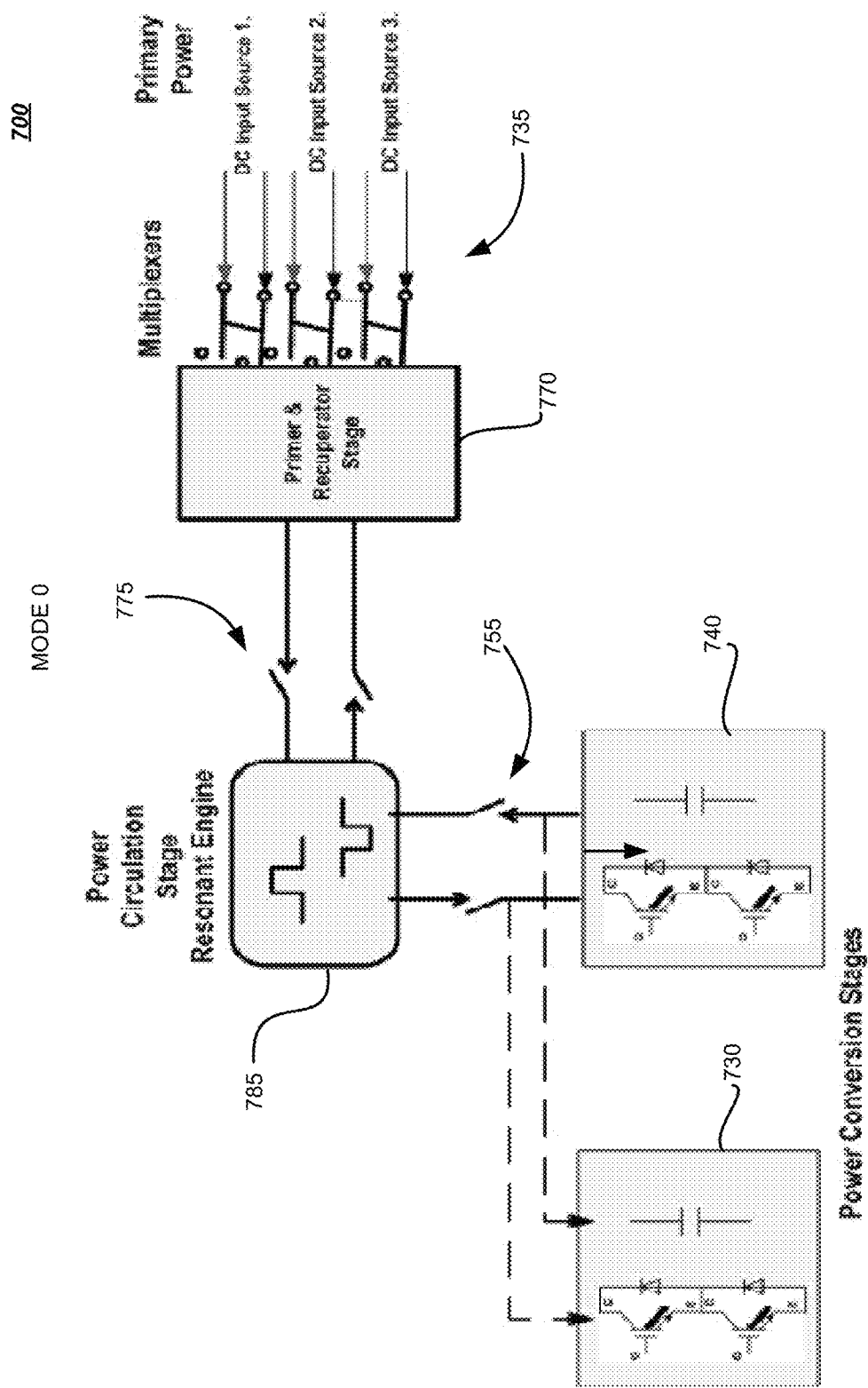
FIG. 7 is a simplified block diagram of an exemplary mode 0 subsystem.

FIG. 7 is a simplified block diagram 700 of an exemplary mode 0 subsystem. Use of a plurality of switches/multiplexers 735, 775 provide means to access a number of DC voltage input sources (1, 2, 3) independently of one another and conduct, via controllable switch 755, their sequenced output to a power circulation stage/resonant engine 785. This allows the conversion of any of the selected DC inputs to output switch/multiplexer 755 in one cycle of input multiplexer 735 operation.

One function of power circulation stage/resonant engine 785 is to output a high frequency voltage that can be isolated from the input, representing the input power source's voltage level. Isolation is facilitated due to a continuous nature of a resonant circuit in the power circulation stage/resonant engine 785, such that power is available at the output of the power circulation stage/resonant engine 785 after the selected DC input is removed.

A cycle frequency of switches/multiplexers 735, 775 is an independent variable, but is normally much lower than the frequency at which the resonant circuit of power circulation stage/resonant engine 785 operates—in simulation models the frequency cycle at which each switches/multiplexers 735, 775 operated was chosen as an arbitrary 4 kHz. In the first period of the duty cycle, i.e., 2 kHz or 0.5 mS, at which the switches/multiplexers 735, 775 operate, the power input is used to excite the resonant circuit of power circulation stage/resonant engine 785 via primer & recuperator stage 770.

Primer & recuperator stage 770: Firstly, establishes a reference bias on the input power received and become the catalyst to start resonance in the power circulation stage/resonant engine 785. The Primer & recuperator stage 770 also has the effect of reducing sporadic switching current in the switches 775 that commute power circulation stage/resonant engine 785. Secondly, the Primer & recuperator stage 770 is used in modes 1-3 to assist in the recuperation of power when there is transfer of power to the primary source from either an auxiliary power source (not shown) or from regenerative power. Power circulation stage/resonant engine 785 operates at a higher frequency than multiplexer 770 (or multiplexer to a secondary source) and establishes a continuous resonant waveform that becomes active after the first half-cycle period of multiplexer 770. This high frequency waveform is available as an isolated voltage sine wave representing the DC input that was chosen by multiplexer 770 (in some simulations, this was a 65 kHz sine wave that is output from power circulation stage/resonant engine 785. As indicated above, the "output" in the second half of the input multiplexer 770 is inactive—"off."

Figure 8:
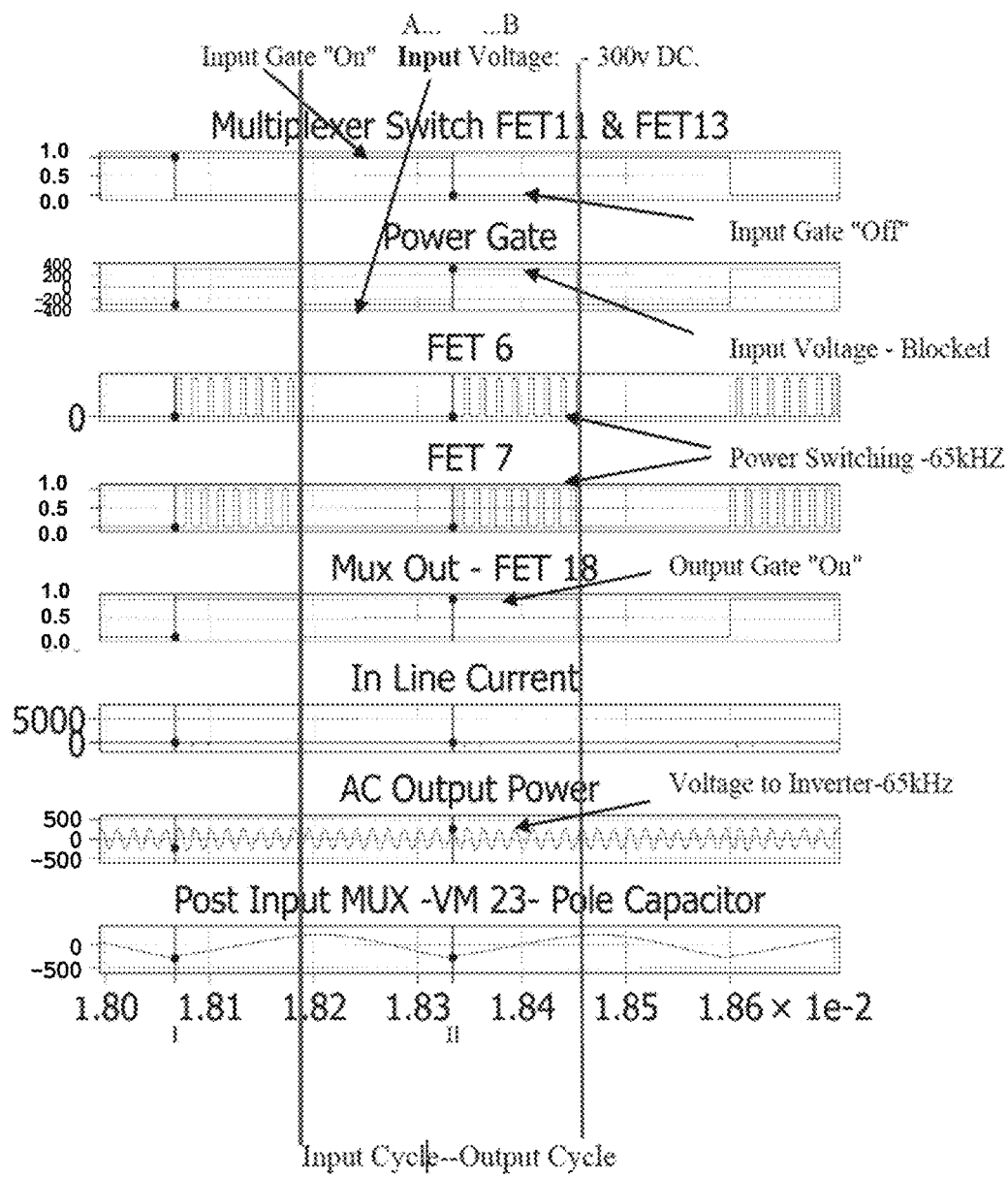
FIG. 8 is a plot illustrating the on/off switch states and resulting output power, for the subsystem described in FIG. 7.

From there, the output multiplexer (represented in this scenario by FIG. 2's FET18 and FET19) can be made active to receive the high frequency signal that was generated by the input voltage in the first half of the duty cycle. The routine is rotated by each multiplexer 735, channel chosen in a "circular" fashion. FIG. 8's traces illustrate the sequencing described. Depending on design implementation, a chosen multiplexer 735, channel input may be used for more than one full cycle if required before transitioning to another multiplexer 735 input channel for a separate DC source.

An operational objective is to access and balance the multiple DC inputs in a sequenced fashion and transport their power in an isolated mode to the DC rails of power conversion stages 730, 740. Understanding this, several subtle considerations arise:

1. By choosing and sequencing selected DC inputs via multiplexer 770, a balancing algorithm can be devised that can extend a fixed energy DC source, for example, a battery.

2. If the output was supplying power-to-power conversion stages 730, 740, then similarly an output buffer battery (interleaved therein and supplying power to the power conversion stages 730, 740) could be efficiently managed by the balancing algorithm.

FIG. 8 is a plot 800 illustrating the on/off switch states and isolation for output power for the subsystem described in FIG. 7. Specifically, both the input and output multiplexers (see topmost and $5^{th}$ trace) operate at 4 kHz and are inverse to each other. In this one cycle event the input power acquisition is carried out in the first half of the 4 kHz cycle and then delivered to the output in the second half of the same cycle. While occurring in the same cycle, they are isolated from each other.

Mode 1—Interleaved Power Train Operation of Resonant Engine

Figure 9:
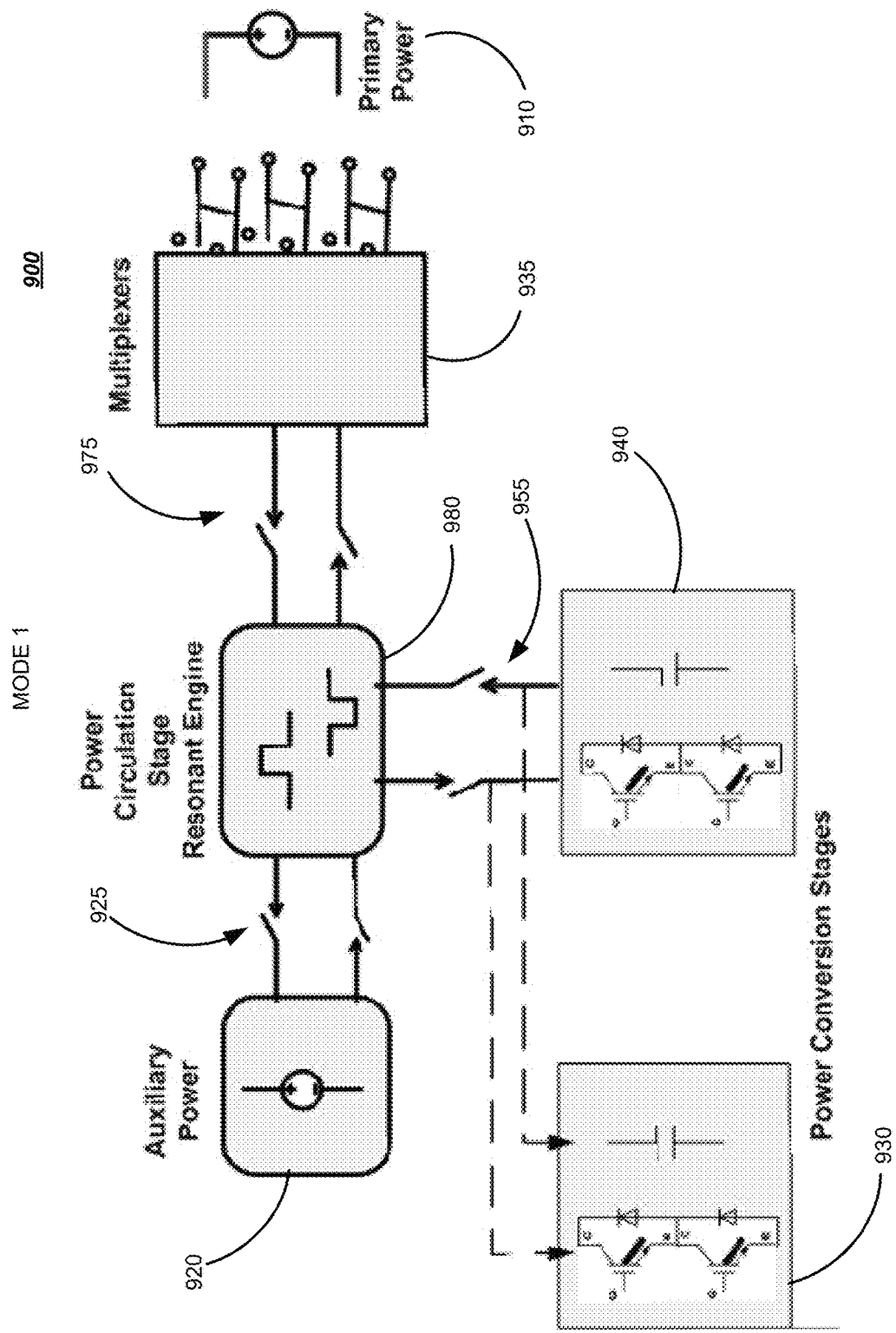
FIG. 9 is a simplified block diagram of an exemplary mode 1 subsystem.

FIG. 9 is a simplified block diagram 900 of an exemplary mode 1 subsystem. Two alternative power sources (primary 910 and/or auxiliary 920) may be used to excite the resonant engine 980. The addition of the auxiliary power source 920 may be used for, but is not limited to:

(a) Ride through (b) Gain compensation (c) MPPT (Maximum Power Point Tracking)—compensation in a case, for example, a solar array is composed of several stages or strings of panels. Each stage/string is used as a separate power input being tapped by the front-end multiplex 935.

By changing the pulse train period of switches 925, 975, the gain factor of resonant engine 980 can be altered. For example, if auxiliary power source 920 has a voltage that is greater or equal to the primary voltage source's 910 voltage, then the output of the resonant engine 980 will be increased. Therefore, the gain factor can be manipulated by changing the voltage level from the auxiliary power source 920. The gain factor can be used a compensatory additive to the primary power source that was selected by the mix, or, as a ride-through property. As in Mode 0, this facility can be used on any multiplexed input. This would entail a "wrap-around" (not shown) of one of the DC inputs at the primary source 910 and routing it to the input of the auxiliary source 920. If the output of the was supplying three single phase bridges that constituted a 3-phase grid supply output this may be used to compensate any phase for balancing purposes.

Figure 10:
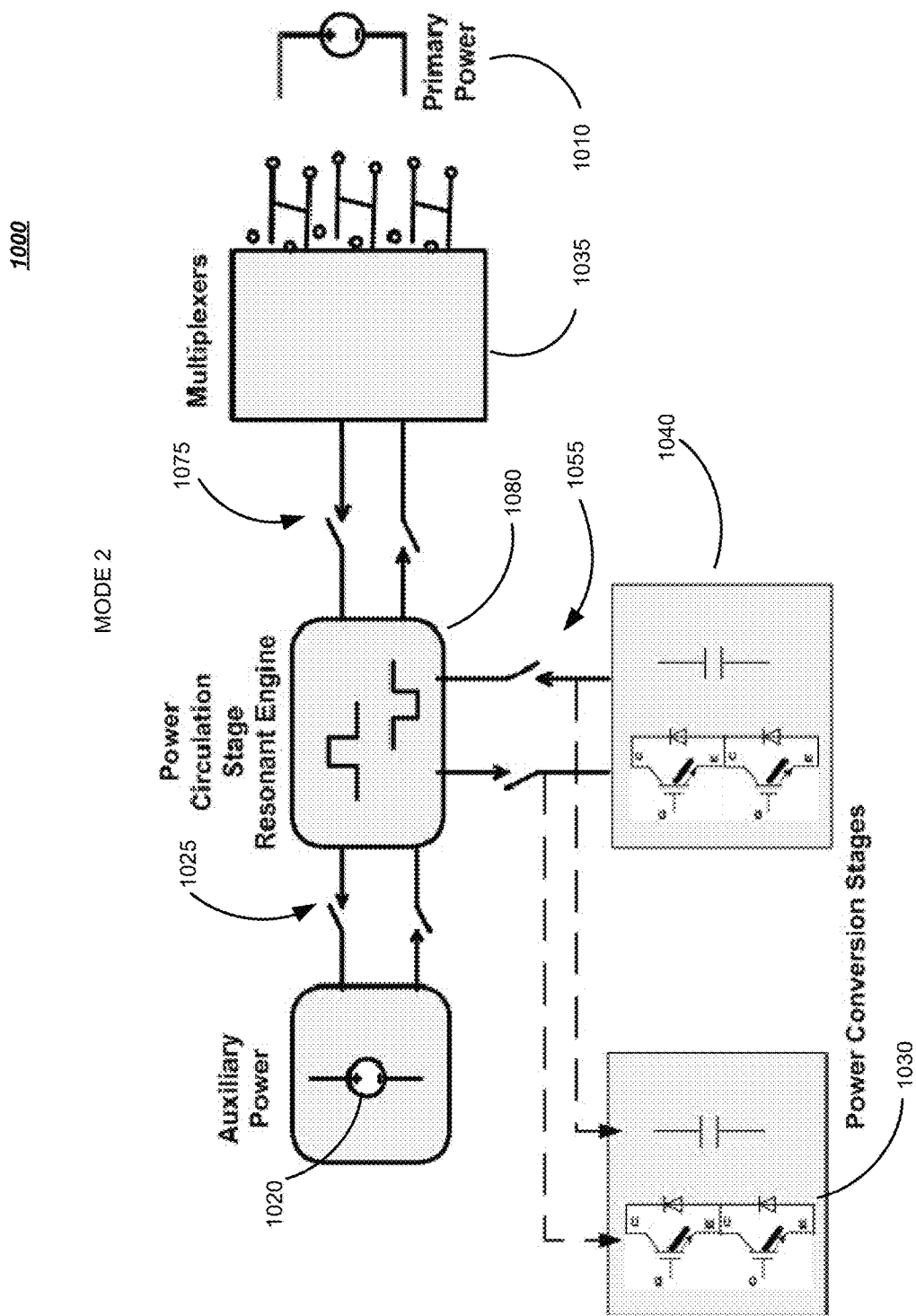
FIG. 10 is a simplified block diagram of an exemplary mode 2 subsystem.

Alternatively it could be used to compensate for an input battery state where one segment of a multiple cell battery requires less power drain than others—a means of balancing until recharge can be applied to this battery segment as will be described in Mode 2, seen in FIG. 10 below. As mentioned previously this could be fulfilled by taking one, or more, of the DC multiplexed inputs to the auxiliary input side and then using this input to balance another segment of the same battery. In other applications it could be used to compensate for low irradiation periods when the DC input represents a solar array Mode 2—Bi-Lateral Power Flow Between Power Sources FIG. 10 is a simplified block diagram 1000 of an exemplary mode 2 subsystem. This mode uses the asymmetry between the primary power source 1010 and the auxiliary power source 1020 as they reside in the system at either horizontal end of the resonant engine 1080. In Mode 2, either power source 1010, 1020 may be used as a reservoir of energy that can be transferred to charge the other if required. This assumes that at least one of the power sources can receive charge, such as a battery etc. Either source may excite the resonant engine 1080, or, in some instances they may be used in an alternate fashion to excite and perpetuate the resonant engine 1080. In the operational scenario where one power source 1010, 1020 via multiplexer 1035, switches 1025, 1075 transfers energy to the other, the output can still be maintained by interleaving the two activities of transferring charge between sources and supplying power via switch 1055 to the conversion stage(s) 1030 1040 to an output load, in either an interleaved fashion, or in alternate sequencing.

It deserves mention here that the same can be said for an output port of the resonant engine 1080 where this becomes an input (as in Mode 3) to transfer regenerative power back to either the primary 1010, or auxiliary power source 1020. Generally speaking, the resonant engine 1080 outputs a high frequency voltage representing the selected power source from any one of the three ports that caused the resonant engine 1080 to originate power circulation in the first place. The resonant engine 1080 in this system operates therefore as a three-way bidirectional power circulation corridor.

Mode 3—Regenerative Power Return

Figure 11:
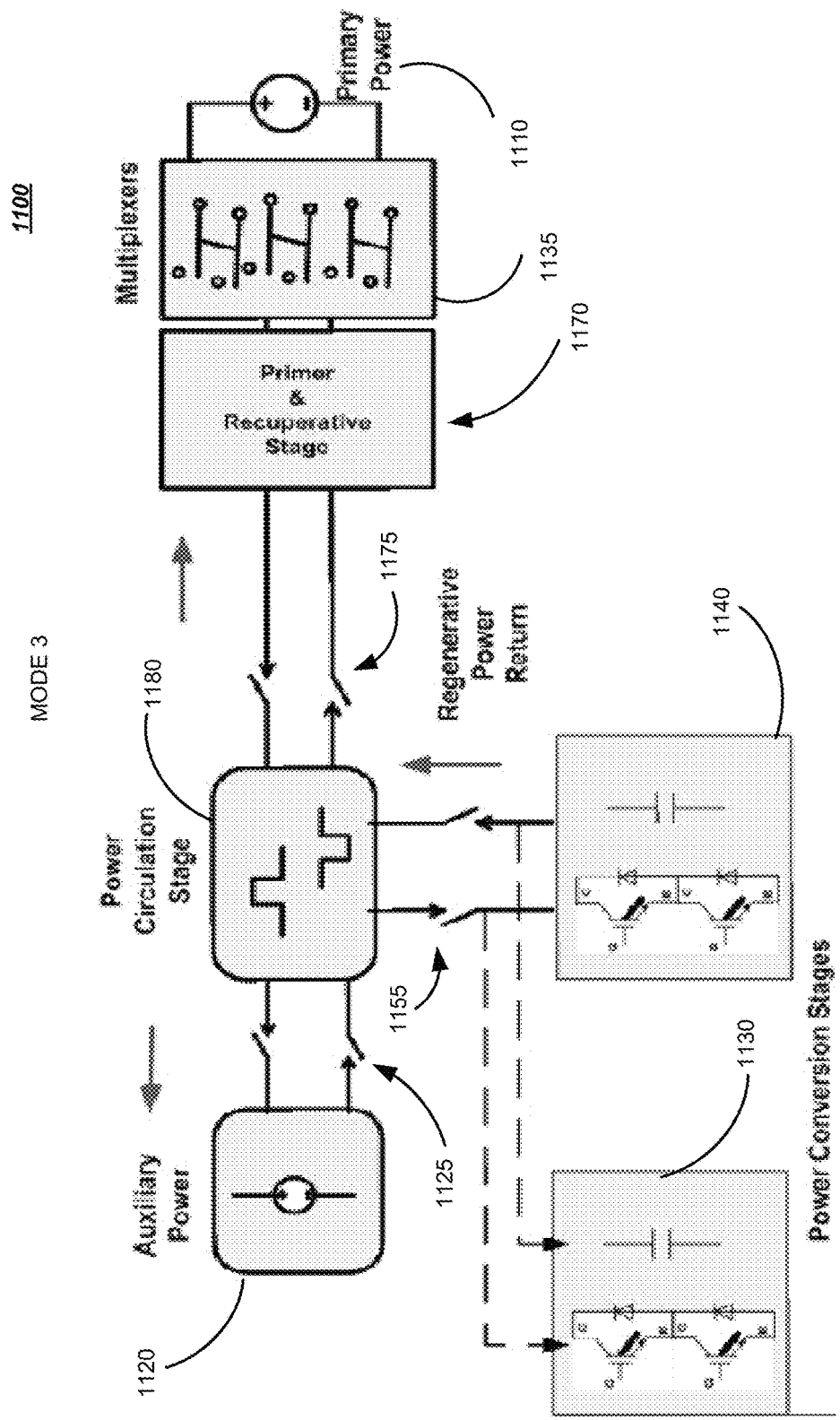
FIG. 11 is a simplified block diagram of an exemplary mode 3 subsystem.

FIG. 11 is a simplified block diagram 1100 of an exemplary mode 3 subsystem. This mode represents the harvesting of power from a load (not shown) that is controlled by a power inverter. A power inverter normally supplies AC power to a load that is converted from a DC supply applied to the rails of the inverter. As indicated in FIG. 11, several power inverters 1130, 1140 may be supplied power from the primary power source 1110, or the auxiliary power source 1120, or a combination of the two. These multiple inverters 1130, 1140 can be supplied through multiplexers 1155 similar to the multiplexers 1135 at the primary power source 1110. It should be mentioned at this point that the high frequency output of the power circulation stage 1180 is rectified and applied as a DC level to the power rails of the inverters 1130, 1140. This may be a simple rectification stage as the high frequency output of the circulation stage 1180 requires little filtering to arrive at a DC equivalent.

In the case where the load is an electric motor controlled by an inverter, there will be periods when the load demand is negative and there will be surplus voltage as the motor transitions into generator mode. This is seen as additional voltage on the DC rails of the inverter 1130, 1140 and may be commutated by the inverter 1130, 1140 back to the power circulation stage 1180. A decision has to be made, once the power circulation stage 1180 is excited, to return voltage back to the auxiliary 1120 or primary power source 1110, through the primer & recuperative stage 1170.

This choice is made by selecting the switches 1175, 1125 at either side of the power circulation stage 1180. A balance may have to be reached between the regenerative power available and the potential to absorb this energy by the power sources. Referring to FIG. 2, for example, FET 18 and FET 19 initially can manage the return of regenerative power to the input power source(s). A finding here is that if the bi-matrix switches 1175 associated with stage 1 are in the "off" period when voltage is transitioned to the primary power source 1110, the symmetry of the waveform is improved considerably. The opening of this "gate" moves the circulatory power in stage 1 (e.g., circulation) to stage 2 (e.g., recuperation). Thus, the transition of power from stage 2 to the primary power source 1110 takes place in isolation to the regenerative source of power. The methodology presented here leads to isolated operation between power nodes that receive power, and those that provide it.

Figure 12:
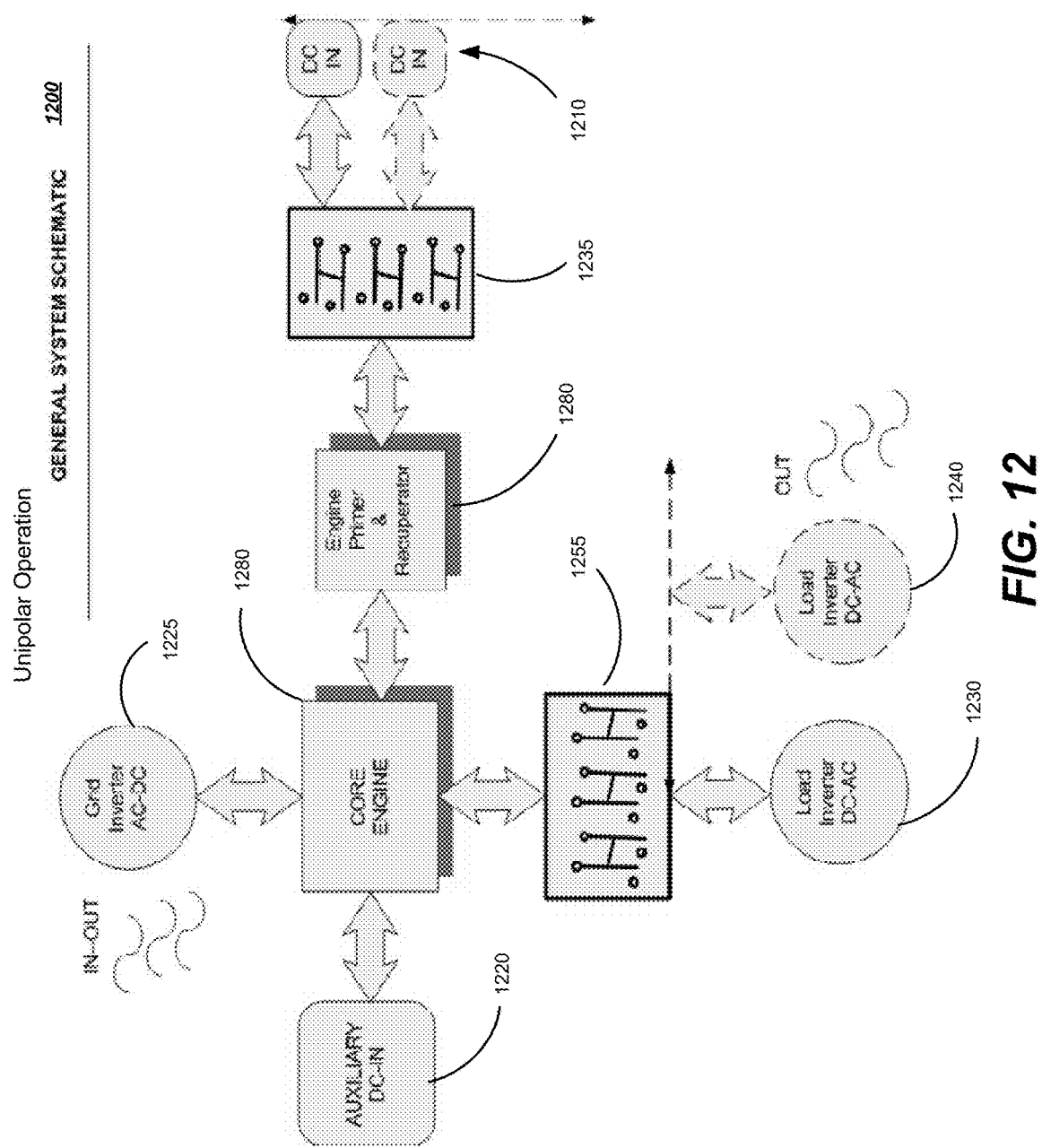
FIG. 12 is a general system diagram showing a core engine design in a unipolar operation.

FIG. 12 is a general system diagram 1200 showing a core engine 1280 design where the input voltage is either unipolar, or bi-polar. Here, many of the same features of the embodiments described above are presented, however in addition to the primary power source 1210; auxiliary power source 1220, there is an AC grid power source 1215 that is input into the system as another DC power source via AC-DC conversion 1225. Thus, external AC grid 1215 can also act as a power input. Not shown is a switching circuit that is between the AC-DC conversion 1225 and the core engine 1280. However, it should be understood that the switching circuit may be integral or part of the AC-DC conversion 1225, depending on design implementation. Further, FIG. 12 shows a load inverter 1230 with optionally tiered load inverter 1240, which produces DC-AC output 1290 to respective load(s) (not shown). As apparent, multiplexer/switch 125 transfers power to the inverter(s) 1230 (1240), and multiplexer 1235 transfers power from one or more of the primary power sources 1210. Appropriates switches are disposed between the engine primer/recuperator 1280 and the core engine 1280, as well as from the auxiliary power source 1220.

Figure 13:
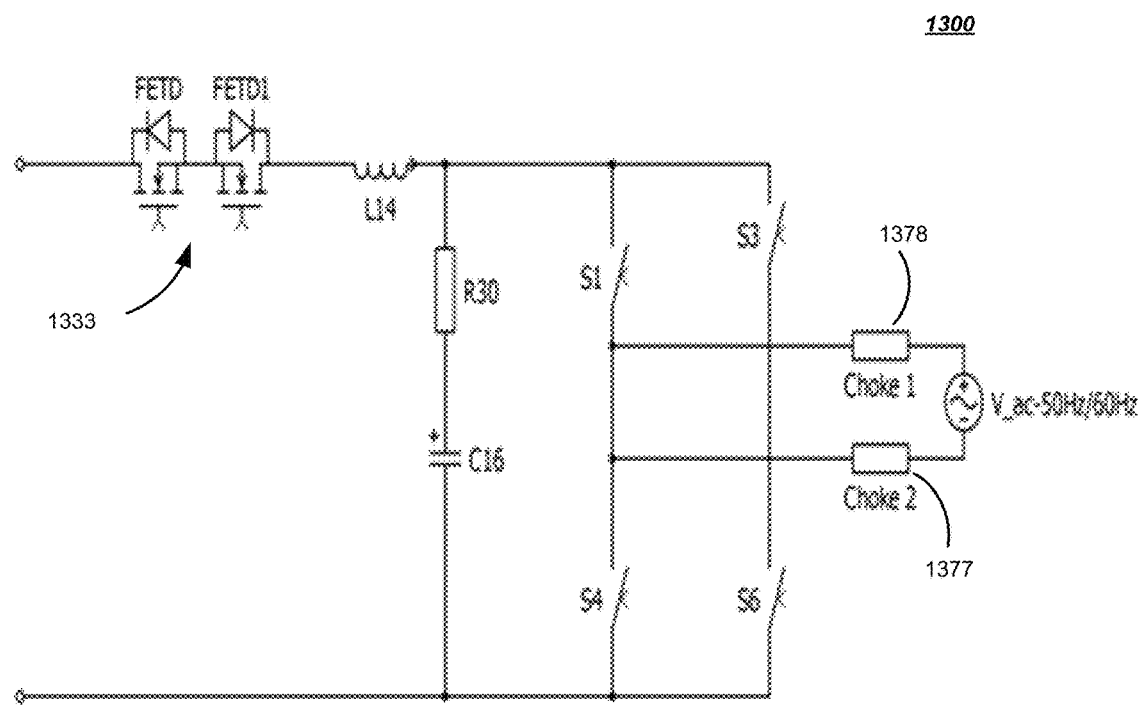
FIG. 13 partial schematic of an AC 50/60 Hz connection, suitable with an exemplary embodiment.

FIG. 13 partial schematic 1300 of an AC 50/60 Hz output, suitable with an exemplary embodiment. As alluded above, an AC utility output can be realized with the present system. The multiplexed output from the exemplary topology can be a combination of sequenced DC inputs. Dependent on how many DC inputs are transferred to the output multiplexers/switches 1333, latency times should be considered when each input is acquiesced. The high frequency signal that appears at the input to the output multiplexer(s) 1333 will conclude as a continuous signal if each input is acquiesced in rotation. The output multiplexer(s) 1333 can be configured as a bi-matrix switch without a DC output. This being the case, a simple controllable H-bridge can manufacture the 50/60 Hz signal with appropriately switching at switches S1, S4, S3, S6. Intrinsic isolation will occur between the input that output with the addition of two in-line chokes 1377, 1378. It should be understood that FIG. 13 is a very simple example of how AC can be generated from the exemplary topology, and should not be interpreted as limiting the topology AC output to this example. As well understood in the art, other approaches to generating AC from DC can be utilized without departing from the spirit and scope of this disclosure.

In view of the above disclosure, it should be appreciated that various modifications may be made to the shown embodiments. For example, (a) Operation frequency—the frequency of multiplexed DC power acquisition can be different from the values chosen, and made to vary to change the voltage output and control peak current in the relationship with the resonant frequency. (b) DC Link Capacitor—pre-charging could be implemented to assist the resonant engine in load changing conditions. (c) Energy storage buffer—there could be many applications where the output of the resonant engine with its pseudo DC voltage component in the high frequency AC could be used to charge a battery that would act as a buffer between the resonant engine and the power converter stages. Given that the output multiplexers can operate in a manner to mimic the input multiplexers, the output multiplexers could be replaced by one output that would feed a battery. This would then become the DC source for the power converters and the resonant tank would act as the battery chargers, with the necessary battery management controller. Alternatively, the output multiplexers could also feed into individual buffer batteries that would support each power inverter. This could be done on a selective basis if there were critical loads that needed to be maintained. (e) Uninterruptable Power Supply (UPS)—since power is obtained from different sources, if one source fails or under voltage occurs, the exemplary system could switch to the alternate power source. Thus, the system could act as an (UPS).

Accordingly, as will be appreciated by one skilled in the art, various methods and processes described herein may be embodied as into a computer controlled system that incorporates some software components. Accordingly, some embodiments of the present disclosure, or portions thereof, may combine one or more hardware components such as microprocessors, microcontrollers, or digital sequential logic, etc., such as processor with one or more software components (e.g., program code, firmware, resident software, micro-code, etc.) stored in a tangible computer-readable memory device such as a tangible computer memory device, that in combination form a specifically configured apparatus that performs the functions as described herein. These combinations that form specially-programmed devices may be generally referred to herein "modules". The software component portions of the modules may be written in any computer language and may be a portion of a monolithic code base, or may be developed in more discrete code portions such as is typical in object-oriented computer languages. In addition, the modules may be distributed across a plurality of computer platforms, servers, terminals, and the like. A given module may even be implemented such that the described functions are performed by separate processors and/or computing hardware platforms.

Also, the functional blocks, methods, devices and systems described in the present disclosure may be integrated or divided into different combinations of systems, devices, and functional blocks, as would be known to those skilled in the art.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A multi-port DC-AC power conversion system, comprising:
    at least one or more primary DC power sources electrically connected to a controllable first input power switch;
    an auxiliary DC power source electrically connected to a controllable second input power switch;
    a power circulator electrically connected to the second input power switch and to the first input power switch, wherein the first power switch connection is either direct or indirectly via an controllable intermediary switch and a power recuperator, wherein the power recuperator is a resonant circuit;
    a controllable output power switch electrically connected to the power circulator;
    at least one or more inverter stages electrically connected to the output power switch,
    wherein a power pathway is formed between the one or more primary DC power sources and the auxiliary DC power source and the one or more inverter stages; and
    a controller, controlling an operation and switching frequency of:
        the first input power switch to conduct power between a selected one or more primary DC power source to the power circulator,
        the second input power switch to conduct power between the auxiliary DC power source to the power circulator, and
        the output power switch to conduct power between the power circulator to a selected one or more inverter stage,
    wherein DC power input from the power sources is converted to an isolated AC power from the selected one or more inverter stages.

2. The system of claim 1, wherein at least one of the first input power, second input power, controllable intermediary, and output power switches is a multiplexer switch.

3. The system of claim 2, wherein the controller controls the first input power multiplexer switch to repeatedly cycle though a plurality of the primary DC power sources.

4. The system of claim 2, wherein the controller controls the output power multiplexer switch to output power through a plurality of inverter stages.

5. The system of claim 1, wherein the system provides single phase AC power at an output of a single inverter stage and three phase AC power at the outputs of three inverter stages.

6. The system of claim 1, wherein at least one of the first input power, second input power, controllable intermediary, and output power switches is a bi-matrix switch.

7. The system of claim 1, wherein the controller controls the switches to only use power from a selected primary DC power source or the auxiliary DC power source.

8. The system of claim 1, wherein the controller controls the switches to alternatively use power from both a selected primary DC power source and the auxiliary DC power source.

9. The system of claim 1, wherein the controller controls the first and second input power switches to direct power from the auxiliary power source to one or more of the primary DC power sources, or direct power from one or more of the primary DC power sources to the auxiliary power source.

10. The system of claim 1, further comprising a load electrically connected to an inverter stage, wherein the controller controls the first and second input power switches and inverter(s) to direct power generated from the load to at least one of the primary DC power sources and the auxiliary power source.

11. The system of claim 1, wherein the controller controls the first input power switch and the intermediary switch to cause resonance in the recuperator stage, wherein energy is optionally fed to the power circulator or to at least one of the primary DC power sources.

12. The system of claim 1, further comprising a rectified AC grid as another input to the power circulator.

13. The system of claim 1, wherein at least one of the primary DC power sources and the auxiliary power source is a rechargeable battery.

14. The system of claim 1, wherein at least one of the primary DC power sources and the auxiliary power source is a solar panel.

15. A method for DC-AC conversion, comprising:

electrically connecting at least one or more primary DC power sources to a controllable first input power switch;

electrically connecting an auxiliary DC power source to a controllable second input power switch;

electrically connecting a power circulator to the second input power switch and to the first input power switch, wherein the first power switch connection is either direct or indirectly via an controllable intermediary switch and a power recuperator, wherein the power recuperator is a resonant circuit;

electrically connecting a controllable output power switch to the power circulator;

electrically connecting at least one or more inverter stages to the output power switch, wherein a power pathway is formed between the one or more primary DC power sources and the auxiliary DC power source and the one or more inverter stages; and controlling an operation and switching frequency of:
  the first input power switch to conduct power between a selected one or more primary DC power source to the power circulator,
  the second input power switch to conduct power between the auxiliary DC power source to the power circulator, and
  the output power switch to conduct power between the power circulator to a selected one or more inverter stage, wherein DC power input from the power sources is converted to an isolated AC power from the selected one or more inverter stages.

16. The method of claim 15, further comprising, switching the first input power switch to cycle though a plurality of the primary DC power sources.

17. The method of claim 15, further comprising, switching the output power multiplexer switch to output power through a plurality of inverter stages.

18. The method of claim 15, further comprising, switching the switches to only use power from a selected primary DC power source or the auxiliary DC power source.

19. The method of claim 15, further comprising, switching the switches to alternatively use power from both a selected primary DC power source and the auxiliary DC power source.

20. The method of claim 15, further comprising, switching the first and second input power switches to direct power from the auxiliary power source to one or more of the primary DC power sources, or direct power from one or more of the primary DC power sources to the auxiliary power source.

21. The method of claim 15, further comprising:
electrically connecting a load to an inverter stage; and
switching the first and second input power switches and inverter(s) to direct power generated from the load to at least one of the primary DC power sources and the auxiliary power source.

22. The method of claim 15, further comprising, switching the first input power switch and the intermediary switch to cause resonance in the recuperator stage, wherein energy is optionally fed to the power circulator or to at least one of the primary DC power sources.

* * * * *